US008952955B2

(12) United States Patent
Yokoyama et al.

(10) Patent No.: US 8,952,955 B2

(45) Date of Patent: Feb. 10, 2015

(54) DISPLAY DRIVING CIRCUIT, DISPLAY DEVICE AND DISPLAY DRIVING METHOD

(75) Inventors: Makoto Yokoyama, Osaka (JP); Yasushi Sasaki, Osaka (JP); Yuhichiroh Murakami, Osaka (JP); Shige Furuta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 340 days.

(21) Appl. No.: 13/375,778

(22) PCT Filed: Feb. 23, 2010

(86) PCT No.: PCT/JP2010/001175

§ 371 (c)(1),
(2), (4) Date: Dec. 2, 2011

(87) PCT Pub. No.: WO2010/146740

PCT Pub. Date: Dec. 23, 2010

(65) Prior Publication Data

US 2012/0086703 A1 Apr. 12, 2012

(30) Foreign Application Priority Data

Jun. 17, 2009 (JP) ................................ 2009-144747

(51) Int. Cl.
*G06F 3/038* (2013.01)
*G09G 3/36* (2006.01)

(52) U.S. Cl.
CPC ............ *G09G 3/3655* (2013.01); *G09G 3/3677* (2013.01); *G09G 3/3614* (2013.01); *G09G 2300/0852* (2013.01); *G09G 2300/0876* (2013.01)
USPC ................................ 345/215; 345/87; 345/96

(58) Field of Classification Search
CPC .............. G09G 3/3614; G09G 3/3655; G09G 2300/0286; G09G 2300/0294; G09G 2300/0876; G09G 2310/0213; G09G 2310/0245; G09G 2310/063
USPC .................................................. 345/92–100
See application file for complete search history.

(56) References Cited

U.S. PATENT DOCUMENTS 5,248,963 A * 9/1993 Yasui et al. .................... 345/98
2002/0084969 A1* 7/2002 Ozawa ........................... 345/96

(Continued)

FOREIGN PATENT DOCUMENTS

JP 2005-049849 A 2/2005
JP 2008-129284 A 6/2008
WO WO-2009/050926 A1 4/2009

OTHER PUBLICATIONS

PCT/ISA/210 and PCT/ISA/237.

*Primary Examiner* — Kent Chang
*Assistant Examiner* — Herbert L Hagemeier
(74) *Attorney, Agent, or Firm* — Harness, Dickey & Pierce

(57) ABSTRACT

A display driving circuit for driving a liquid crystal display panel includes a shift register including a plurality of shift register circuits provided in such a way as to correspond to a plurality of gate lines, respectively, the display driving circuit having latch circuits provided in such a way as to correspond one-by-one to the shift register circuits, a polarity signal being inputted to the latch circuits. When a internal signal generated by a shift register circuit becomes active, a latch circuit loads and retains the polarity signal, and an output from the latch circuit is supplied to a CS bus line. The internal signal becomes active before a first vertical scanning period of a display picture.

16 Claims, 23 Drawing Sheets

(56) References Cited

U.S. PATENT DOCUMENTS

2005/0036078 A1 2/2005 Tsunashima et al.
2007/0002007 A1* 1/2007 Tam .............................. 345/105
2007/0195053 A1* 8/2007 Tobita et al. .................. 345/100
2008/0198120 A1* 8/2008 Senda et al. .................... 345/92
2008/0218466 A1* 9/2008 Koyama et al. ................. 345/96
2010/0128009 A1 5/2010 Okada et al.

* cited by examiner

G1, G2, . . . Gn : SCANNING LINE
CS1, CS2, . . . CSn : AUXILIARY CAPACITOR POWER SUPPLY LINE

DISPLAY DRIVING CIRCUIT, DISPLAY DEVICE AND DISPLAY DRIVING METHOD

TECHNICAL FIELD

The present invention relates to a display driving circuit and a display driving method for driving a display panel in a display device such as a liquid crystal display device having an active-matrix liquid crystal display panel.

BACKGROUND ART

Conventionally, an active-matrix liquid crystal display device including retention capacitor wires has been known to have such a problem that in a case where reverse polarity driving is carried out, an even display cannot be obtained at the time of turning on of power (i.e., in the initial period). This is because the retention capacitor wires are supplied with power potentials that become indefinite immediately after the liquid crystal display device has been turned on.

A technique for solving such a display problem at the time of turning on of power is disclosed, for example, in Patent Literature 1. FIG. 25 is a block diagram schematically showing a configuration of a liquid crystal display device of Patent Literature 1.

The liquid crystal display device includes: data signal lines S1 to Sn provided on a glass substrate and arranged along a second direction; scanning signal lines G1 to Gn provided on the glass substrate and arranged along a first direction; pixel TFTs (transistors) 1 each provided in an area near a point of intersection between a data signal line and a scanning signal line; auxiliary capacitors (retention capacitors) C1 each connected to a drain terminal of a pixel TFT 1; pixel electrodes 2 each connected to a drain terminal of a pixel TFT 1; liquid crystal capacitors C2 each formed between a pixel electrode 2 and a counter electrode 3 disposed opposite the pixel electrode 2 with a liquid crystal layer sandwiched therebetween; a scanning line driving circuit (scanning signal line driving circuit) 4, which drives the scanning lines (scanning signal lines); a source driver (data signal line driving circuit) 5, which drives the data signal lines; auxiliary capacitor power supply lines (retention capacitor wires) CS1 to CSn each connected to an end of each one of a row of auxiliary capacitors C1 arranged along the scanning lines (along the second direction); and an auxiliary capacitor power supply selection circuit (retention capacitor wire driving circuit) 6, which sets the potentials of the auxiliary capacitor power supply lines CS1 to CSn.

FIG. 26 is a circuit diagram showing a configuration of the auxiliary capacitor power supply selection circuit 6 in detail. As shown in FIG. 26, the auxiliary capacitor power supply selection circuit 6 has a PMOS transistor 9, which selects whether or not to supply a first reference potential VcsH to the auxiliary capacitor power supply lines CS1 to CSn, and an NMOS transistor 8, which selects whether or not to supply a second reference potential VcsL (<VcsH) to the auxiliary capacitor power supply lines CS1 to CSn, and these transistors 8 and 9 are turned on/off under control of an AND gate 10 provided in the scanning line driving circuit 4.

The AND gate 10 calculates the logical product of (i) a power-on power supply control signal s1 for controlling the potentials of the auxiliary capacitor power supply lines CS1 to CSn at the time of turning on of power and (ii) a polarity-reversal power supply control signal s2 for controlling the potentials of the auxiliary capacitor power supply lines CS1 to CSn at the time of polarity reversal, and on the basis of a result of the calculation, switches between turning on and off the transistors 8 and 9.

In this configuration, during a predetermined period of time after the time of turning on of power, the power-on power supply control signal s1 is at a low level (0 V), whereby an output from the AND gate 10 (see FIG. 26) in the scanning line driving circuit 4 is at a low level and the PMOS transistor is turned on, with the result that the auxiliary capacitor power supply lines CS1 to CSn are supplied with the first reference voltage VcsH. Since the first reference voltage VcsH is higher than the second reference potential VcsL, the potentials of all of the auxiliary capacitor power supply lines CS1 to CSn are high during the predetermined period of time after the time of turning on of power. When the potentials of the auxiliary capacitor power supply lines CS1 to CSn are high, the potential of each pixel electrode 2 is also relatively high, and the end-to-end potential of each liquid crystal capacitor C2 (i.e., the difference in potential between the counter electrode 3 and each pixel electrode 2) is small. With this, for example, a normally white liquid crystal display device (which carries out a white display when no signal is applied) carries out a display close to a white display even when it is turned on, with the result that no bright line can be seen. After that, after passage of the predetermined period of time, the auxiliary capacitor power supply selection circuit 6 of FIG. 26 raises the power-on power supply control signal s1 to a high level. This causes the logic of the AND gate 10 to change in accordance with the logic of the polarity-reversal power supply control signal s2. Accordingly, the turning on and off of the NMOS transistor 8 and PMOS transistor 9 changes in accordance with the cycle of reverse polarity driving. This causes the potentials of the auxiliary capacitor power supply lines CS1 to CSn to the first reference voltage VcsH or the second reference voltage VcsL in accordance with the cycle of reverse polarity driving.

Thus, in the configuration, since, during a predetermined period of time after the time of turning on of power, all of the auxiliary capacitor power supply lines CS1 to CSn is set to an identical power supply potential (first reference voltage), there is no variation in potential level among the auxiliary capacitor power supply lines CS1 to CSn. This allows elimination of a problem with a display at the time of turning on of power.

CITATION LIST

Patent Literature 1

Japanese Patent Application Publication, Tokukai, No. 2005-49849 A (Publication Date: Feb. 24, 2005)

SUMMARY OF INVENTION

Technical Problem

However, the liquid crystal display device requires signal lines and a control circuit for supplying a predetermined potential to the auxiliary capacitor power supply lines immediately after the liquid crystal display device has been turned on, thus causing an increase in circuit area of the driving circuit. This makes it difficult to use the driving circuit in a liquid crystal display panel with a narrow frame.

The present invention has been made in view of the foregoing problems, and it is an object of the present invention to provide a display driving circuit and a display driving method which, without causing an increase in circuit area, make it possible to improve the quality of a display at the time of turning on of power.

Solution to Problem

A display driving circuit according to the present invention is a display driving circuit for driving a display panel provided with retention capacitor wires forming capacitors with pixel electrodes included in pixels, the display driving circuit including a shift register including a plurality of stages provided in such a way as to correspond to a plurality of scanning signal lines, respectively, the display driving circuit having retaining circuits provided in such a way as to correspond one-by-one to the stages of the shift register, a retention target signal being inputted to each of the retaining circuits, when a control signal generated by one of the stages of the shift register becomes active, a retaining circuits corresponding to this stage loads and retains the retention target signal, an output from a retaining circuit being supplied to a retention capacitor wire as a retention capacitor wire signal, a control signal that is generated by each of the stages of the shift register becoming active before a first vertical scanning period of a display picture.

According to the foregoing configuration, when a control signal that is generated by each of the stages of the shift register (internal signal or output signal) becomes active before a first vertical scanning period (first frame) of a display picture (in an initial period), a retention target signal (polarity signal CMI) is retained in a retaining circuit (latch circuit or memory circuit)) of the corresponding stage. Therefore, for example, in a case where, in the initial period, the retention target signal is set to a certain level of potential (high level or low level), a signal of a certain potential is outputted from the retaining circuit and supplied to a retention capacitor line. This allows fixing the signal potential of a retention capacitor wire after turning on of power and before the beginning of the first frame, thus allowing elimination of a display problem in the initial period due to the aforementioned indefinite state.

Further, the foregoing configuration eliminates the need to provide a control circuit for fixing the signal potential of a retention capacitor wire (i.e., a conventional retention capacitor power supply selection circuit) or the like, and can therefore make a driving circuit smaller in area. Therefore, by using the display driving circuit, a liquid crystal display panel can be made to have a narrower frame.

A display driving method according to the present invention is a display driving method for driving a display panel, provided with retention capacitor wires forming capacitors with pixel electrodes included in pixels, which includes a shift register including a plurality of stages provided in such a way as to correspond to a plurality of scanning signal lines, respectively, the display driving method including the steps of: inputting a retention target signal to retaining circuits provided in such a way as to correspond to the stages of the shift register, respectively, and when a control signal generated by a current stage of the shift register becomes active, causing a retaining circuit corresponding to the current stage to load and retain the retention target signal; supplying an output from a retaining circuit to a retention capacitor wire as a retention capacitor wire signal; and before a first vertical scanning period of a display picture, rendering active a control signal that is generated by each of the stages of the shift register.

The method brings about the same effect as that stated in relation to the display driving circuit, i.e., an effect of, without causing an increase in circuit area, making it possible to improve the quality of a display at the time of turning on of power.

Advantageous Effects of Invention

As described above, a display driving circuit and a display driving method according to the present invention are configured such that a control signal that is generated by each of the stages of the shift register to be inputted to a retaining circuit becomes active before a first vertical scanning period of a display picture. This allows fixing the signal potential of a retention capacitor wire, thus bringing about an effect of, without causing an increase in circuit area, making it possible to improve the quality of a display at the time of turning on of power.

DESCRIPTION OF EMBODIMENTS

An embodiment of the present invention is described below with reference to the drawings.

Figure 1:
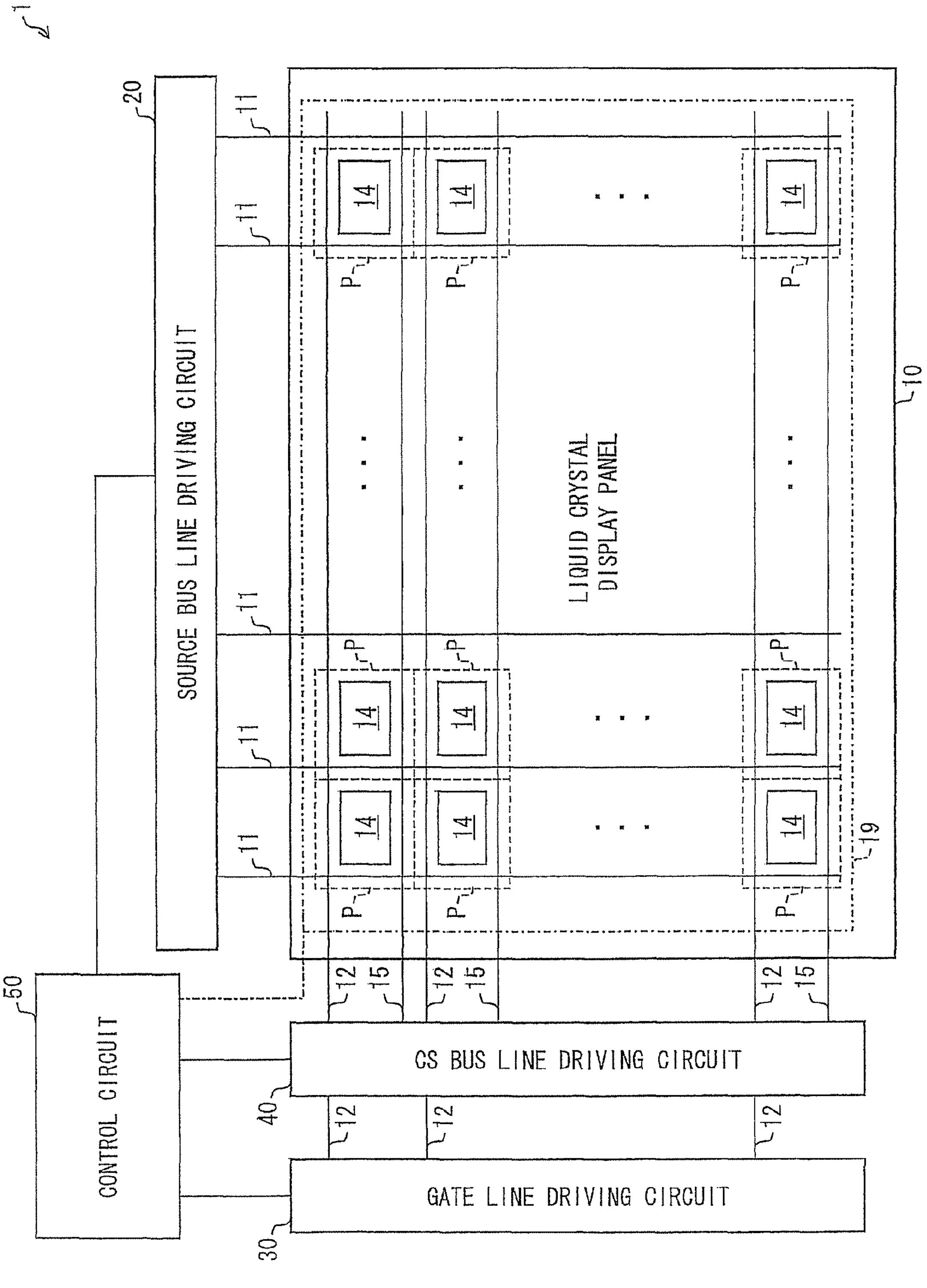
FIG. 1 is a block diagram showing a configuration of a liquid crystal display device according to an embodiment of the present invention.
Figure 2:
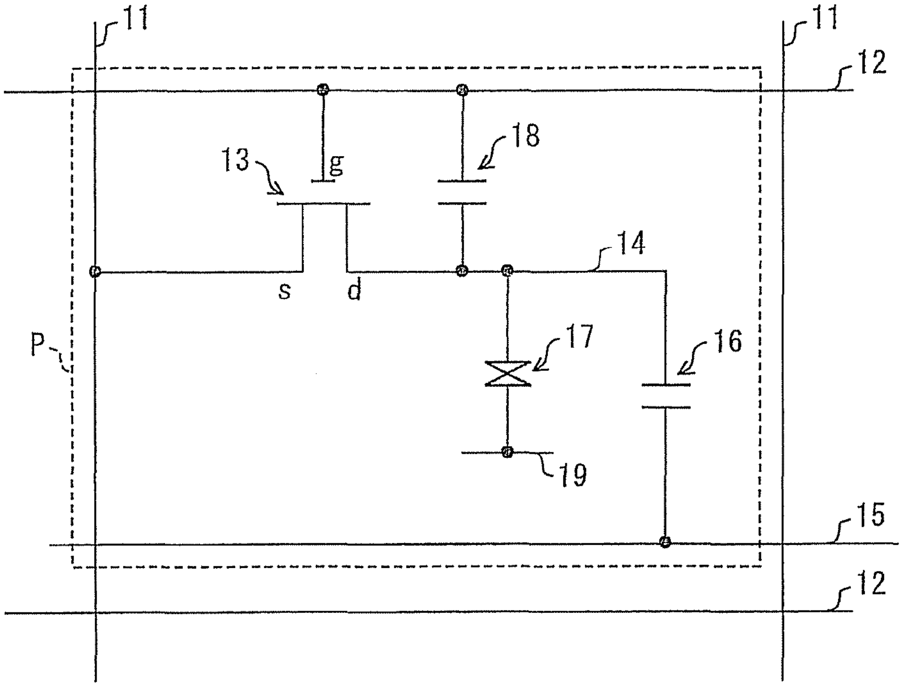
FIG. 2 is an equivalent circuit diagram showing an electrical configuration of each pixel in the liquid crystal display device of FIG. 1.

First, a configuration of a liquid crystal display device 1 corresponding to a display device of the present invention is described with reference to FIGS. 1 and 2. FIG. 1 is a block diagram showing an overall configuration of the liquid crystal display device 1, and FIG. 2 is an equivalent circuit diagram showing an electrical configuration of each pixel of the liquid crystal display device 1.

The liquid crystal display device 1 includes: an active-matrix liquid crystal display panel 10, which corresponds to a display panel of the present invention; a source bus line driving circuit 20, which corresponds to a data signal line driving circuit of the present invention; a gate line driving circuit 30, which corresponds to a scanning signal line driving circuit of the present invention; a CS bus line driving circuit 40, which corresponds to a retention capacitor wire driving circuit of the present invention; and a control circuit 50, which corresponds to a control circuit of the present invention.

The liquid crystal display panel 10, constituted by sandwiching liquid crystals between an active matrix substrate and a counter substrate (not illustrated), has a large number of pixels P arranged in rows and columns.

Moreover, the liquid crystal display panel 10 includes: source bus lines 11, provided on the active matrix substrate, which correspond to data signal lines of the present invention; gate lines 12, provided on the active matrix substrate, which correspond to scanning signal lines of the present invention; thin-film transistors (hereinafter referred to as "TFTs") 13, provided on the active matrix substrate, which correspond to switching element of the present invention; pixel electrodes 14, provided on the active matrix substrate, which correspond to pixel electrodes of the present invention; CS bus lines 15, provided on the active matrix substrate, which correspond to retention capacitor wires of the present invention; and a counter electrode 19 provided on the counter substrate. It should be noted that each of the TFTs 13, omitted from FIG. 1, is shown in FIG. 2 alone.

The source bus lines 11 are arranged one by one in columns in parallel with one another along a column-wise direction (longitudinal direction), and the gate lines 12 are arranged one by one in rows in parallel with one another along a row-wise direction (transverse direction). The TFTs are each provided in correspondence with a point of intersection between a source bus line 11 and a gate line 12, so are the pixel electrodes 14. Each of the TFTs 13 has its source electrode s connected to the source bus line 11, its gate electrode g connected to the gate line 12, and its drain electrode d connected to a pixel electrode 14. Further, each of the pixel electrode 14 forms a liquid crystal capacitor 17 with the counter electrode 19 with liquid crystals sandwiched between the pixel electrode 14 and the counter electrode 19.

With this, when a gate signal (scanning signal) supplied to the gate line 12 causes the gate of the TFT 13 to be on and a source signal (data signal) from the source bus line 11 is written into the pixel electrode 14, the pixel electrode 14 is given a potential corresponding to the source signal. In the result, the potential corresponding to the source signal is applied to the liquid crystals sandwiched between the pixel electrode 14 and the counter electrode 19. This allows realization of a gray-scale display corresponding to the source signal.

The CS bus lines 15 are arranged one by one in rows in parallel with one another along a row-wise direction (transverse direction), in such a way as to be paired with the gate lines 12, respectively. The CS bus lines 15 each form a retention capacitor 16 (referred to also as "auxiliary capacitor") with each one of the pixel electrodes 14 arranged in each row, thereby being capacitively coupled to the pixel electrodes 14.

It should be noted that since, because of its structure, the TFT 13 has a pull-in capacitor 18 formed between the gate electrode g and the drain electrode d, the potential of the pixel electrode 14 is affected (pulled in) by a change in potential of the gate line 12. However, for simplification of explanation, such an effect is not taken into consideration here.

The liquid crystal display panel 10 thus configured is driven by the source bus line driving circuit 20, the gate line driving circuit 30, and the CS bus line driving circuit 40. Further, the control circuit 50 supplies the source bus line driving circuit 20, the gate line driving circuit 30, and the CS bus line driving circuit 40 with various signals that are necessary for driving the liquid crystal display panel 10.

In the present embodiment, during an active period (effective scanning period) in a vertical scanning period that is periodically repeated, each row is allotted a horizontal scanning period in sequence and scanned in sequence. For that purpose, in synchronization with a horizontal scanning period in each row, the gate line driving circuit 30 sequentially outputs a gate signal for turning on the TFTs 13 to the gate line 12 in that row. The gate line driving circuit 30 will be described in detail later.

The source bus line driving circuit 20 outputs a source signal to each source bus line 11. This source signal is obtained by the source bus line driving circuit 20 receiving a video signal from an outside of the liquid crystal display device 1 via the control circuit 50, allotting the video signal to each column, and giving the video signal a boost or the like.

Figure 3:
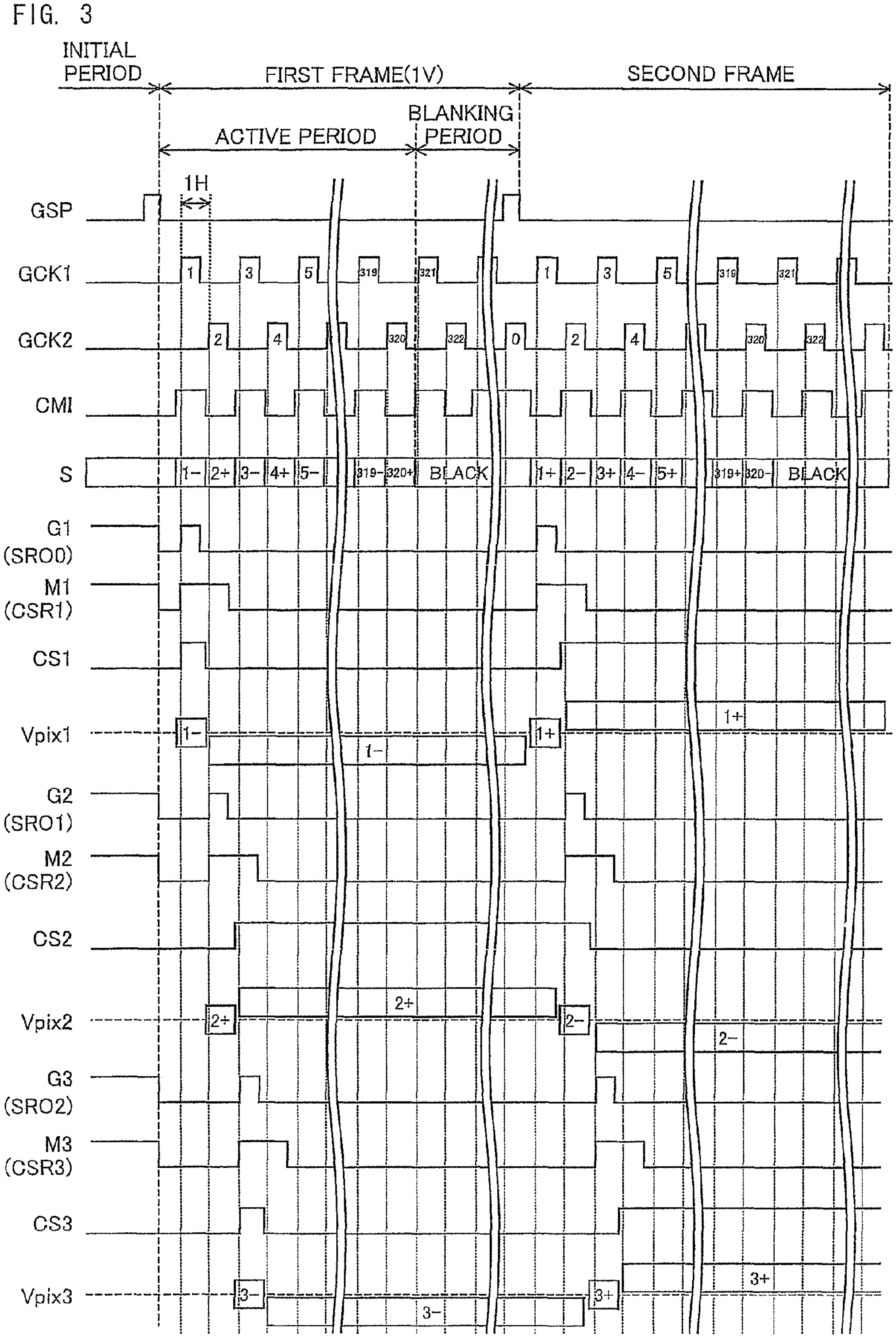
FIG. 3 is a timing chart showing waveforms of various signals of the liquid crystal display device in Embodiment 1.

Further, for example, in order to carry out line inversion driving, the source bus line driving circuit 20 is configured such that the polarity of the source signal it outputs is identical for all pixels in an identical row and reversed every adjacent n (n is a natural number) rows. For example, as shown in FIG. 3, the horizontal scanning period in the first row and the horizontal scanning period in the second row are opposite in polarity of the source signal S (1-line (1H) inversion driving). It should be noted that the source bus line driving circuit 20 in the present embodiment is not limited to line inversion driving, but may carry out frame inversion driving.

The CS bus line driving circuit 40 outputs a CS signal corresponding to a retention capacitor wire signal of the present invention to each CS bus line 15. This CS signal is a signal whose potential switches (rises or falls) between two values (high and low potentials). The CS bus line driving circuit 40 will be described in detail later.

The control circuit 50 controls the gate line driving circuit 30, the source bus line driving circuit 20, and the CS bus line driving circuit 40, thereby causing each of them to output signals as shown in FIG. 3. Although, in FIG. 1, the gate line driving circuit 30 and the CS bus line driving circuit 40 are located on one side of the liquid crystal display panel 10, this does not imply any limitation. The gate line driving circuit 30 and the CS bus line driving circuit 40 may be located on different sides of the liquid crystal display panel 10. Such an example configuration will be described later (in Embodiment 2).

In the present embodiment, attention should be paid to the features of the gate line driving circuit 30 and the CS bus line driving circuit 40 among those members which constitute the liquid crystal display device 1. In the following, the gate line driving circuit 30 and the CS bus line driving circuit 40 are described in detail. Although the following gives a description of a liquid crystal display device that carries out CC (charge-coupling) driving, the liquid crystal display device of the present invention is not limited to CC driving.

(Embodiment 1)

FIG. 3 is a timing chart showing waveforms of various signals in a liquid crystal display device 1 of Embodiment 1. Embodiment 1 is described by taking as an example a case where 1-line (1H) inversion driving is carried out. In FIG. 3, GSP is a gate start pulse signal, that defines a timing of vertical scanning, and GCK1 (CK) and GCK2 (CKB) are gate clock signals that are outputted from the control circuit to define a timing of operation of the shift register. A period from a falling edge to the next falling edge in GSP corresponds to a single vertical scanning period (1V period). A period from a rising edge in GCK1 to a rising edge in GCK2 and a period from a rising edge GCK2 to a rising edge in GCK1 each correspond to a single horizontal scanning period (1H period). CMI (initial setting signal) is a polarity signal that reverses its polarity every single horizontal scanning period.

Further, FIG. 3 shows the following signals in the order named: a source signal S (video signal), which is supplied from the source bus line driving circuit 20 to a source bus line 11 (source bus line 11 provided in the xth column); a gate signal G1, which is supplied from the gate line driving circuit 30 to a gate line 12 provided in the first row; a CS signal CS1 (CSOUT1), which is supplied from the CS bus line driving circuit 40 to a CS bus line 15 provided in the first row; and a potential waveform Vpix1 of a pixel electrode 14 provided in the first row and the xth column. Further, FIG. 3 shows the following signals in the order named: a gate signal G2, which is supplied to a gate line 12 provided in the second row; a CS signal CS2 (CSOUT2), which is supplied to a CS bus line 15 provided in the second row; and a potential waveform Vpix2 of a pixel electrode 14 provided in the second row and the xth column. Furthermore, FIG. 3 shows the following signals in the order named: a gate signal G3, which is supplied to a gate line 12 provided in the third row; a CS signal CS3 (CSOUT3), which is supplied to a CS bus line 15 provided in the third row; and a potential waveform Vpix3 of a pixel electrode 14 provided in the third row and the xth column.

It should be noted that the dotted lines in the potentials Vpix1, Vpix2, and Vpix3 indicate the potential of the counter electrode 19.

In the following, it is assumed that the start frame of a display picture is a first frame and that the first frame is preceded by an initial state (initial period). In Embodiment 1, as shown in FIG. 3, during an initial state after turning on of power (i.e., during a period from the end of passage of a predetermined period of time after turning on of power to the beginning of the start frame (first frame) of a display picture), the CS signals CS1, CS2, and CS3 are all fixed at one potential (in FIG. 3, at a low level). In the first frame, the CS signal CS1 in the first row and the CS signal CS3 in the third row switch from a low level to a high level in synchronization with rising edges in their corresponding gate signals G1 and G3, respectively, and are at a high level at points in time where the gate signals G1 and G3 fall. Therefore, the potential of a CS signal in each row at a point in time where its corresponding gate signal falls is different from the potential of a CS signal in an adjacent row at a point in time where its corresponding gate signal falls. For example, the CS signal CS1 is at a high level at a point in time where its corresponding gate signal G1 falls, and the CS signal CS2 is at a low level at a point in time where its corresponding gate signal G2 falls, and the CS signal CS3 is at a high level at a point in time where its corresponding gate signal G3 falls.

It should be noted that the source signal S is a signal which has amplitude corresponding to a gray scale represented by a video signal and which reverses its polarity every 1H period. Further, since it is assumed in FIG. 3 that a uniform picture is displayed, the amplitude of the source signal S is constant. Meanwhile, the gate signals G1, G2, and G3 serve as gate-on potentials during the first, second, and third 1H periods, respectively, in an active period (effective scanning period) of each frame, and serve as gate-off potentials during the other periods.

Then, the CS signals CS1, CS2, and CS3 are reversed after their corresponding gate signals G1, G2, and G3 fall, and take such waveforms that adjacent rows are opposite in direction of reversal to each other. Specifically, in an odd-numbered frame (first frame, third frame, . . . ), the CS signals CS1 and CS3 fall after their corresponding gate signals G1 and G3 fall, and the CS signal CS2 rises after its corresponding gate signal G2 falls. Further, in an even-numbered frame (second frame, fourth frame, . . . ), the CS signals CS1 and CS3 rise after their corresponding gate signals G1 and G3 fall, and the CS signal CS2 falls after its corresponding gate signal G2 falls.

It should be noted that the relationship between rising and falling edges in the CS signals CS1, CS2, and CS3 in the odd-numbered and even-numbered frames may be opposite of the relationship stated above.

Since, in FIG. 3, adjacent rows are different from each other in terms of the potentials of the CS signals at points in time where the gate signals fall in the first frame, the CS signals CS1, CS2, and CS3 in the first frame takes the same waveforms as in a normal odd-numbered frame (e.g., the third frame). Therefore, since the potentials Vpix1, Vpix2, and Vpix3 of the pixel electrodes 14 are all properly shifted by the CS signals CS1, CS2, and CS3, respectively, inputting of source signals S of the same gray scale causes the positive and negative potential differences between the potential of the counter electrode and the shifted potential of each of the pixel electrodes 14 to be equal to each other. That is, in the first frame, in which a source signal of a negative polarity is written into the odd-numbered pixels in the same column of pixels and a source signal of a positive polarity is written into the even-numbered pixels in the same column of pixels, the potentials of the CS signals corresponding to the odd-numbered pixels are not polarity-reversed during the writing into the odd-numbered pixels, are polarity-reversed in a negative direction after the writing, and are not polarity-reversed until the next writing, and the potentials of the CS signals corresponding to the even-numbered pixels are not polarity-reversed during the writing into the even-numbered pixels, are polarity-reversed in a positive direction after the writing, and are not polarity-reversed until the next writing.

This driving allows fixing the potential of each CS signal in an initial state to be fixed at one side (which is a low level or a high level), thus allowing elimination of a display problem in the initial period. Further, in the first frame and later, the potential of each pixel electrode can be properly shifted.

Figure 4:
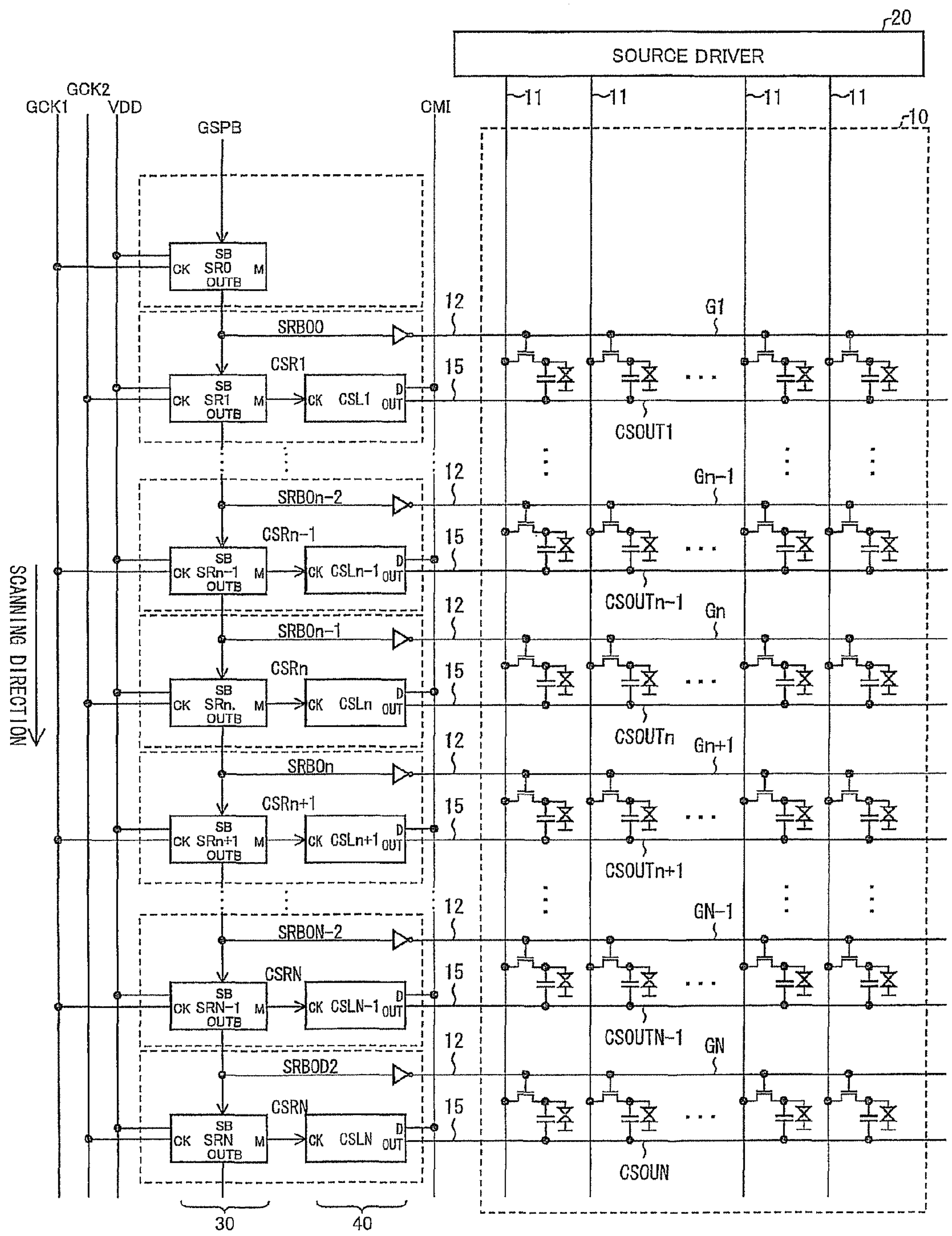
FIG. 4 is a block diagram showing a configuration of a gate line driving circuit and a CS bus line driving circuit in Embodiment 1.

A specific configuration of the gate line driving circuit 30 and the CS bus line driving circuit 40 for achieving the aforementioned control is described here. FIG. 4 shows a configuration of the gate line driving circuit 30 and the CS bus line driving circuit 40. In the following, for convenience of explanation, the row (line) (next row) following the nth row in a scanning direction (indicated by an arrow in FIG. 4) is represented as the (n+1)th row, and the row (previous row) immediately preceding the nth row in the scanning direction is represented as the (n−1)th row.

As shown in FIG. 4, the gate line driving circuit 30 has a plurality of shift register circuits SR corresponding to their respective rows, and the CS bus line driving circuit 40 has a plurality of retaining circuits (latch circuits, memory circuits) CSL corresponding to their respective rows. For convenience of explanation, the shift register circuits SRn−1, SRn, and SRn+1 and the latch circuits CSLn−1, CSLn, and CSLn+1, which correspond to the (n−1)th, nth, and (n+1)th rows respectively, are taken as an example here.

The shift register circuit SRn−1 in the (n−1)th row receives the gate clock signal GCK1 via its clock terminal CK from the control circuit 50 (see FIG. 1), and receives a shift register output SRBOn−2 from the previous row (the (n−2)th row) via its input terminal SB as a set signal for the shift register circuit SRn−1. The shift register circuit SRn−1 has its output terminal OUTB connected to the input terminal SB of the shift register circuit SRn of the next row (the nth row). This allows the shift register circuit SRn−1 to output a shift register output SRBOn−1 via its output terminal OUTB to the shift register circuit SRn. The shift register circuit SRn−1 has its output terminal M connected to the clock terminal CK of the latch circuit CSLn−1 of the current row (the (n−1)th row). This allows the shift register circuit SRn−1 to input a signal CSRn−1 inside thereof (internal signal Mn−1) (control signal) to the latch circuit CSLn−1.

Further, the shift register output SRBOn−2 from the previous row (the (n−2)th row) is both inputted to the shift register circuit SRn−1 and outputted as a gate signal Gn−1 (SROn−2: inversion signal of SRBOn−2) to the gate line 12 of the current row (the (n−1)th row) via a buffer. Further, the shift register circuit SRn−1 is supplied with a power supply (VDD).

The latch circuit CSLn−1 in the (n−1)th row receives the polarity signal CMI from the control circuit 50 (see FIG. 1) and the internal signal Mn−1 (signal CSRn−1) from the shift register circuit SRn−1. The latch circuit CSLn−1 has its output terminal OUT connected to the CS bus line 15 of the current row (the (n−1)th row). This allows the latch circuit CSLn−1 to output a CS signal CSOUTn−1 via its output terminal OUT to the CS bus line 15 of the current row.

The shift register circuit SRn in the nth receives the gate clock signal GCK2 via its clock terminal CK from the control circuit 50 (see FIG. 1), and receives a shift register output SRBOn−1 from the previous row (the (n−1)th row) via its input terminal SB as a set signal for the shift register circuit SRn. The shift register circuit SRn has its output terminal OUTB connected to the input terminal SB of the shift register circuit SRn+1 of the next row (the (n+1)th row). This allows the shift register circuit SRn to output a shift register output SRBOn via its output terminal OUTS to the shift register circuit SRn+1. The shift register circuit SRn has its output terminal M connected to the clock terminal CK of the latch circuit CSLn of the current row (the nth row). This allows the shift register circuit SRn to input an internal signal Mn generated inside thereof (signal CSRn) to the latch circuit CSLn.

Further, the shift register output SRBOn−1 from the previous row (the (n−1)th row) is both inputted to the shift register circuit SRn and outputted as a gate signal Gn (SROn−1: inversion signal of SRBOn−1) to the gate line 12 of the current row (the nth row) via a buffer. Further, the shift register circuit SRn is supplied with the power supply (VDD).

The latch circuit CSLn in the nth row receives the polarity signal CMI from the control circuit 50 (see FIG. 1) and the internal signal Mn (signal CSRn) generated inside of the shift register circuit SRn. The latch circuit CSLn has its output terminal OUT connected to the CS bus line 15 of the current row (the nth row). This allows the latch circuit CSLn to output a CS signal CSOUTn via its output terminal OUT to the CS bus line 15 of the current row.

The shift register circuit SRn+1 in the (n+1)th row receives the gate clock signal GCK1 via its clock terminal CK from the control circuit 50 (see FIG. 1), and receives a shift register output SRBOn from the previous row (the nth row) via its input terminal SB as a set signal for the shift register circuit SRn+1. The shift register circuit SRn+1 has its output terminal OUTB connected to the input terminal SB of the shift register circuit SRn+2 of the next row (the (n+2)th row). This allows the shift register circuit SRn+1 to output a shift register output SRBOn+1 via its output terminal OUTB to the shift register circuit SRn+2. The shift register circuit SRn+1 has its output terminal M connected to the clock terminal CK of the latch circuit CSLn+1 of the current row (the (n+1)th row). This allows the shift register circuit SRn+1 to input an internal signal Mn+1 generated inside thereof (signal CSRn+1) to the latch circuit CSLn+1.

Further, the shift register output SRBOn from the previous row (the nth row) is both inputted to the shift register circuit SRn+1 and outputted as a gate signal Gn+1 (SROn: inversion signal of SRBOn) to the gate line 12 of the current row (the (n+1)th row) via a buffer. Further, the shift register circuit SRn+1 is supplied with the power supply (VDD).

The latch circuit CSLn+1 in the (n+1)th row receives the polarity signal CMI from the control circuit 50 (see FIG. 1) and the internal signal Mn+1 (signal CSRn+1) generated inside of the shift register circuit SRn+1. The latch circuit CSLn+1 has its output terminal OUT connected to the CS bus line 15 of the current row (the (n+1)th row). This allows the latch circuit CSLn+1 to output a CS signal CSOUTn+1 via its output terminal OUT to the CS bus line 15 of the current row.

Figure 5:
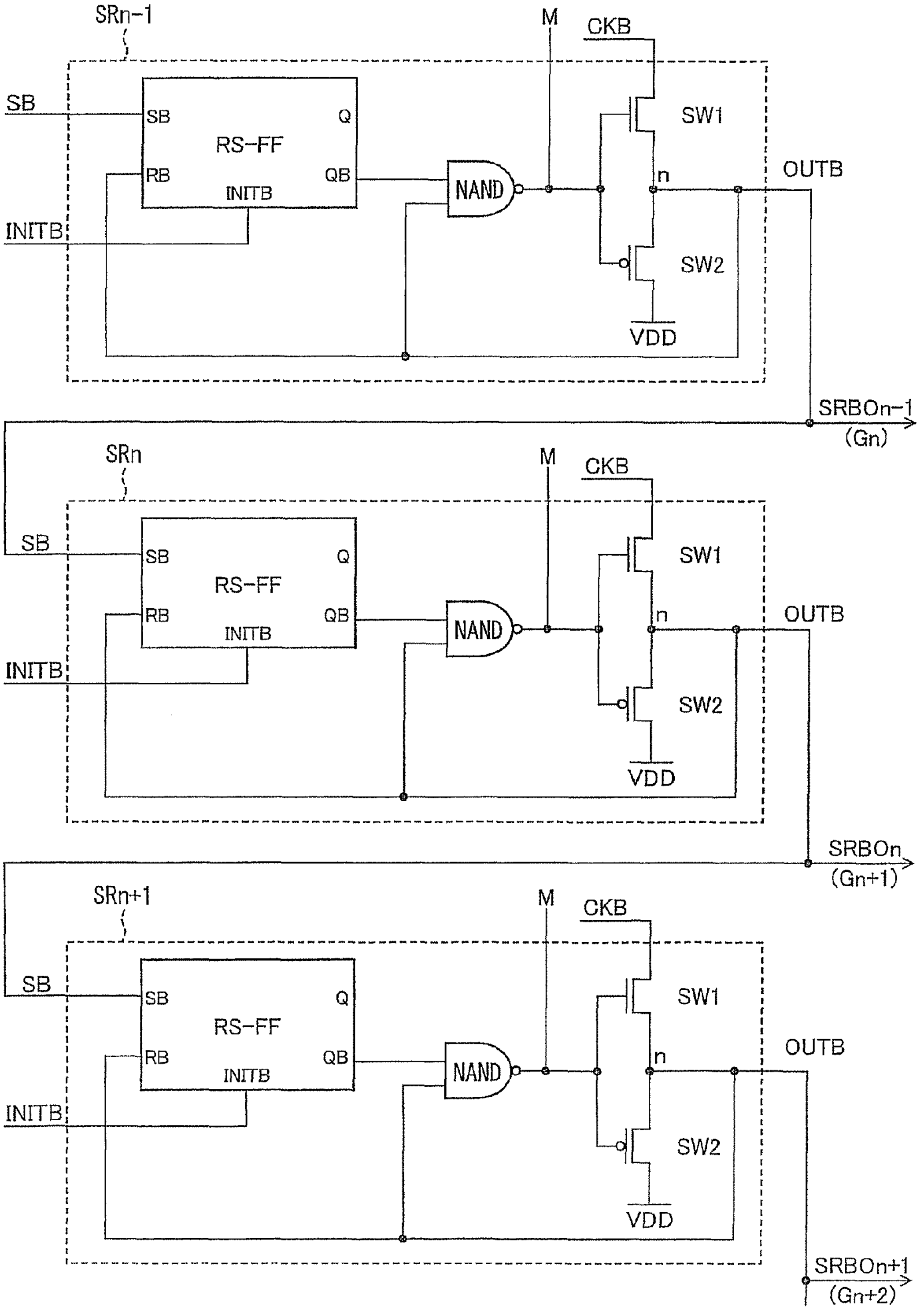
FIG. 5 shows a configuration of a shift register circuit in Embodiment 1.

The following explains operation of each shift register circuit SR. FIG. 5 shows the shift register circuits SRn−1, SRn, and SR+1 in the (n−1)th, nth, and (n+1)th rows in detail. It should be noted that the shift register circuit SR in each row is identical in configuration to the shift register circuits SRn−1, SRn, and SR+1. The following explanation is centered on the shift register circuit SRn in the nth row.

As shown in FIG. 5, the shift register circuit SRn includes an RS type flip-flop circuit RS-FF, a NAND circuit, and switching circuits SW1 and SW2. The flip-flop circuit RS-FF receives the shift register output SRBOn−1 (OUTB) via its input terminal SB from the previous row (the (n−1)th row) as a set signal as described above. The NAND circuit has its first input terminal connected to an output terminal QB of the flip-flop circuit RS-FF and its second input terminal connected to the output terminal OUTB of the shift register circuit SRn. The NAND circuit has its output terminal M connected to control electrodes of the analog switching circuits SW1 and SW2 and connected to the clock terminal CK (see FIG. 4) of the latch circuit CSLn of the current row (the nth row). The analog switching circuits SW1 and SW2 receive, from the NAND circuit, an internal signal Mn (signal CSRn) that controls each of the analog switching circuits SW1 and SW2 so that it switches between ON and OFF. The analog switching circuit SW1 has a first conductive electrode to which the gate clock signal CKB (GCK2) is inputted and a second conductive electrode connected to a first conductive electrode of the analog switching circuit SW2, and the analog switching circuit SW2 has a second conductive electrode that is supplied with the power supply (VDD). The analog switching circuits SW1 and SW2 are connected to each other at a connection point n connected to the output terminal OUTB of the shift register circuit SRn, the first input terminal of the NAND circuit, and the input terminal RB of the flip-flop circuit RS-FF of the current row (the nth row). The shift register circuit SRn has it output terminal OUTB connected to the input terminal SB of the next row (the (n+1)th row). This allows the shift register output SRBOn (OUTB) of the current row (the nth row) to be inputted as a set signal for the shift register circuit SRn+1 of the next row (the (n+1)th row).

In the foregoing configuration, the output OUTB of the shift register circuit SRn is inputted as a reset signal to the input terminal RB of the flip-flop circuit RS-FF; therefore, the shift register circuit SRn functions as a self-resetting flip-flop.

A specific operation of the shift register circuit SRn is described below with reference to FIG. 6.

First, when the set signal SB (SRBOn−1) inputted to the shift register circuit SRn changes from a high level to a low level (becomes active), the output QB from the flip-flop circuit RS-FF changes from a high level to a low level, and the internal signal Mn, which is an output from the NAND circuit, changes from a low level to a high level (t1). When the internal signal Mn has been raised to a high level, the analog switching circuit SW1 is turned on, whereby the clock signal CKB is outputted to OUTB. This raises the output signal OUTB to a high level. During a period of time in which the output QB at a low level and the output OUTB at a high level are being inputted to the NAND circuit (t1 to t2), the NAND circuit outputs the internal signal Mn at a high level, whereby the output signal OUTB is raised to a high level. When the set signal SB has been raised to a high level (t2), the clock signal CKB is still at a high level at this point in time. Therefore, the flip-flop circuit RS-FF is not reset, whereby the output QB is maintained at a low level and the internal signal Mn and the output signal OUTB are maintained at a high level (t2 to t3).

Then, when the clock signal CKB has been dropped to a low level (t3), the output signal OUTB is dropped to a low level, and the flip-flop circuit RS-FF is reset, whereby the output signal QB changes from a low level to a high level. Since the output signal QB at a high level and the output signal OUTB at a low level are inputted to the NAND circuit, the internal signal Mn is maintained at a high level and the output signal OUTB is maintained at a low level (t3 to t4). When the clock signal CKB changes from a low level to a high level (t4), the output signal OUTB is raised to a high level, and the output signal QB at a high level and the output signal OUTB at a high level are inputted to the NAND circuit, so that the internal signal Mn changes from a high level to a low level.

The output OUTB thus generated allows the shift register circuit SRn+1 in the next row (the (n+1) row) to start an operation and the shift register circuit SRn in the current row (the nth row) to carry out a reset operation.

It should be noted here that the internal signal Mn, which is generated inside of the shift register circuit SRn, becomes active in a period of time from a point in time where the set signal SB has become active to a point in time where the reset signal RB (CKB) becomes active. Moreover, the internal signal Mn is inputted to the clock terminal CK of the latch circuit CSLn in the current row (nth row) (signal CSRn of FIG. 4).

Figure 7:
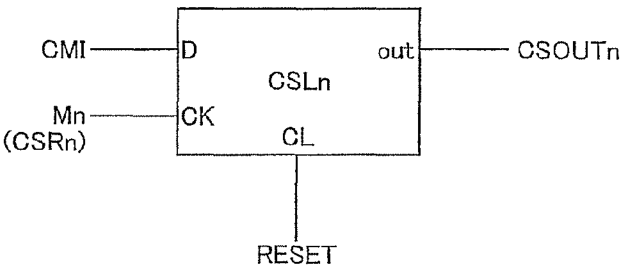
FIG. 7 shows a configuration of a logic circuit (latch circuit) in Embodiment 1.

The following explains operation of each latch circuit CSL. FIG. 7 shows the latch circuit CSLn in the nth row in detail. It should be noted that the latch circuit CSL in each row is identical in configuration to the latch circuit CSLn. The following explanation refers to the latch circuit CSL in each row as the latch circuit CSLn.

The latch circuit CSLn receives the internal signal Mn (signal CSRn) via its clock terminal CK (see FIG. 4) from the shift register circuit SRn as described above. The latch circuit CSLn receives the polarity signal CMI via its input terminal D from the control circuit 50 (see FIG. 1). This allows the latch circuit CSLn to output an input state of the polarity signal CMI as a CS signal CSOUTn in accordance with a change in potential level of the internal signal Mn (from a low level to a high level or from a high level to a low level), and the CS signal CSOUTn indicates the change in potential level. Specifically, when the potential level of the internal signal Mn that the latch circuit CSLn receives via its clock terminal CK is a high level, the latch circuit CSLn outputs an input state (low level or high level) of the polarity signal CMI that it receives via its input terminal D. When the potential level of the internal signal Mn that the latch circuit CSLn receives via its clock terminal CK has changed from a high level to a low level, the latch circuit CSLn latches the input state (low level or high level) of the polarity signal CMI that it received via its input terminal D at the time of change, and keeps the latched state until the next time when the potential level of the internal signal Mn that the latch circuit CSLn receives via its clock terminal CK is raised to a high level. Then, the latch circuit CSLn outputs the latched state as the CS signal CSOUTn, which indicates the change in potential level, via its output terminal OUT.

Figure 8:
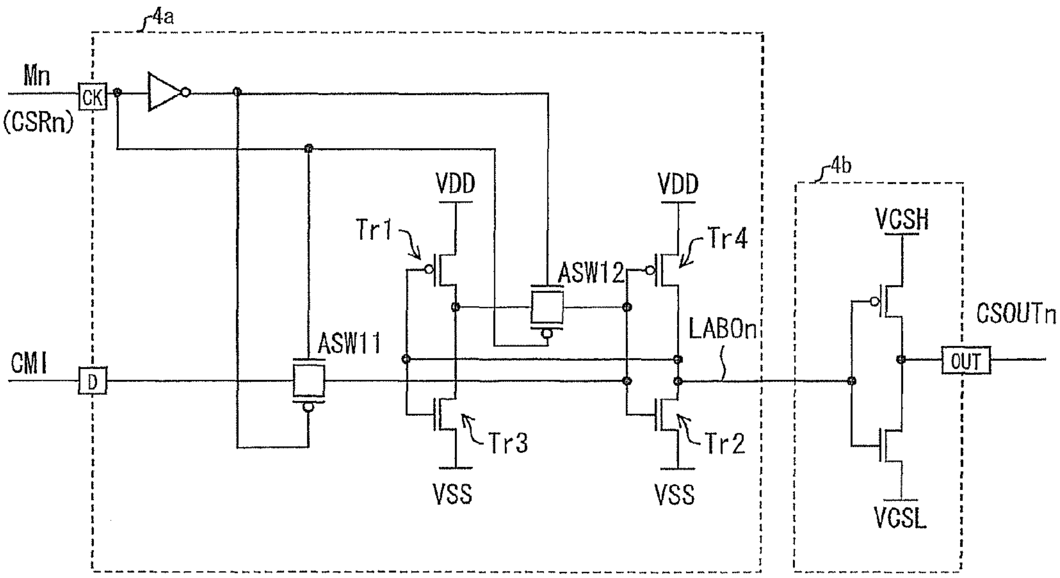
FIG. 8 is a circuit diagram of the latch circuit shown in FIG. 7.

It should be noted that the latch circuit CSLn can be specifically achieved, for example, by a configuration shown in the circuit diagram of FIG. 8. As shown in FIG. 8, the latch circuit CSLn is configured to include a latch through circuit 4*a* and a buffer 4*b*. The latch through circuit 4*a* is constituted by four transistors, two analog switching circuits SW11 and SW12, and one inverter, and the buffer 4*b* is constituted by two transistors.

(As to an Initial Operation)

Figure 9:
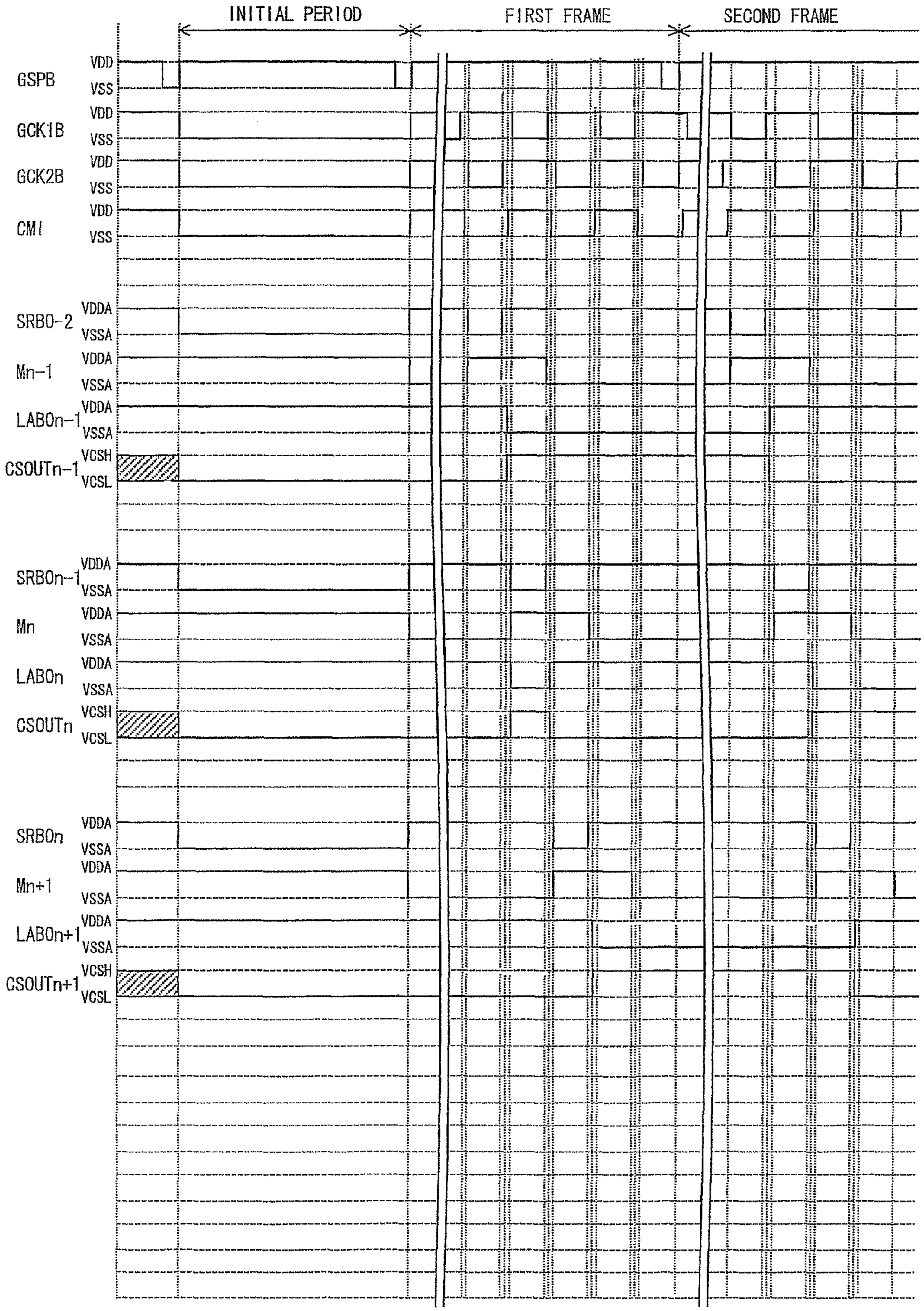
FIG. 9 is a timing chart showing waveforms of various signals that are inputted to and outputted from the latch circuit shown in FIG. 7.

FIG. 9 is a timing chart showing waveforms of various signals that are inputted to and outputted from the shift register circuits, SR and the D latch circuits CSL. FIG. 9 shows waveforms during an initial operation after the liquid crystal display device 1 has been turned on, an operation in the first vertical scanning period (first frame) of a display picture, and an operation in the next vertical scanning period (second frame). The initial operation is explained here.

In an initial state (initial period) after turning on of the liquid crystal display device 1, the clock signals GCK1B and GCK2B and the polarity signal CMI are set to a low level. Specifically, when the liquid crystal display device 1 has been turned on, the control circuit 50 (see FIG. 1) outputs control signals such as GSPB in accordance with which GCK1B, GCK2B, and CMI are outputted at a low level. At the same time, GSPB is inputted to the shift register circuit SR0 of the first stage (the zeroth row).

It should be noted here that, as shown in FIG. 5, the shift register circuit SRn outputs CKB or Vdd in accordance with the internal signal Mn, which controls the analog switching circuits SW1 and SW2. That is, while the internal signal Mn is active (at a high level), the analog switching circuit SW1 is turned on so that CKB is kept being outputted. Moreover, while the set signal SB, which is inputted to the shift register circuit SRn, is active, the internal signal Mn is maintained in an active state (see FIG. 6). Therefore, while an active signal is being inputted to the shift register circuit SRn, the internal signal Mn becomes active, and CKB is kept being outputted. Since, in the initial state, CKB is set to a low level, a low-level signal is outputted while an active signal is being inputted to the shift register circuit SRn.

With this configuration, at the same time as GSPB is inputted to the first-stage shift register circuit SR0, a low-level signal is inputted to each shift register circuit SR and the internal signal M and the output signal OUTB (SRBO) become active. It should be noted that an internal delay in signal wiring or the like is omitted for the sake of convenience.

In the initial state, as described above, the shift register circuit SR at each stage outputs the clock signal CKB at a low level. It should be noted that the clock signal CKB outputted at a low level from the register circuit SR at each stage is supplied to the corresponding gate line GL via a buffer (see FIG. 4), whereby all the gate lines GL become active. For example, by supplying the counter electrode potential Vcom to each source line here, the potentials of all the pixel electrodes in the initial state can be fixed at Vcom.

During the above operation, the internal signal Mn from the shift register circuit SRn is inputted to the latch circuit CSLn shown in FIG. 8. When the latch through circuit 4*a*, which constitutes the latch circuit CSLn, receives an active (high-level) internal signal Mn via its clock terminal CK, the analog switching circuit SW11 is turned on, and the polarity signal CMI (at a low level) inputted to the input terminal D is inputted to the transistor Tr1 so that the transistor Tr1 is turned on, whereby a signal LABOn is outputted at a high level (Vdd) (see FIG. 9). When the signal LABOn outputted from the latch through circuit 4*a* is inputted to the buffer 4*b*, the transistor Tr2 is turned on, whereby the signal CSOUTn is outputted at a low level (Vss) (see FIG. 9).

When the latch through circuit 4*a* receives a non-active (low-level) internal signal Mn via its clock terminal CK, the analog switching circuit SW11 is turned off and the analog switching circuit SW12 is turned on. This causes the analog switching circuit SW11 to latch the polarity signal CMI (at a low level) at the point in time where it was turned off, whereby the signal CSOUTn is outputted at a low level (Vss) (see FIG. 9).

In the latch circuit CSLn, as described above, the output signal CSOUTn switches in potential in accordance with a change in potential of the polarity signal CMI while an active signal is being inputted from the shift register circuit SRn. Therefore, since, in the initial state, the polarity signal CMI is set to a low level, the output signal CSOUTn from the latch circuit CSLn in each row is fixed at a low level. It should be noted that in a case where the control circuit 50 (see FIG. 1) is set to output the polarity signal CMI at a high level, the output signal CSOUTn from the latch circuit CSLn in each row is fixed at a high level. This eliminates an indefinite state (indicated by shaded areas in FIG. 9) immediately after turning on of power, and at the beginning of the start frame (first frame) of a display picture, the potential of each CS signal can be fixed at one side (in the example shown in FIG. 9, a low level). This allows elimination of a display problem after turning on of power and before the beginning of the first frame.

(As to Operations in the First and Second Frames)

The following explains operations in the first and second frames. Operation of the shift register circuit SRn and latch circuit CSLn in the nth row is mainly explained here.

Figure 10:
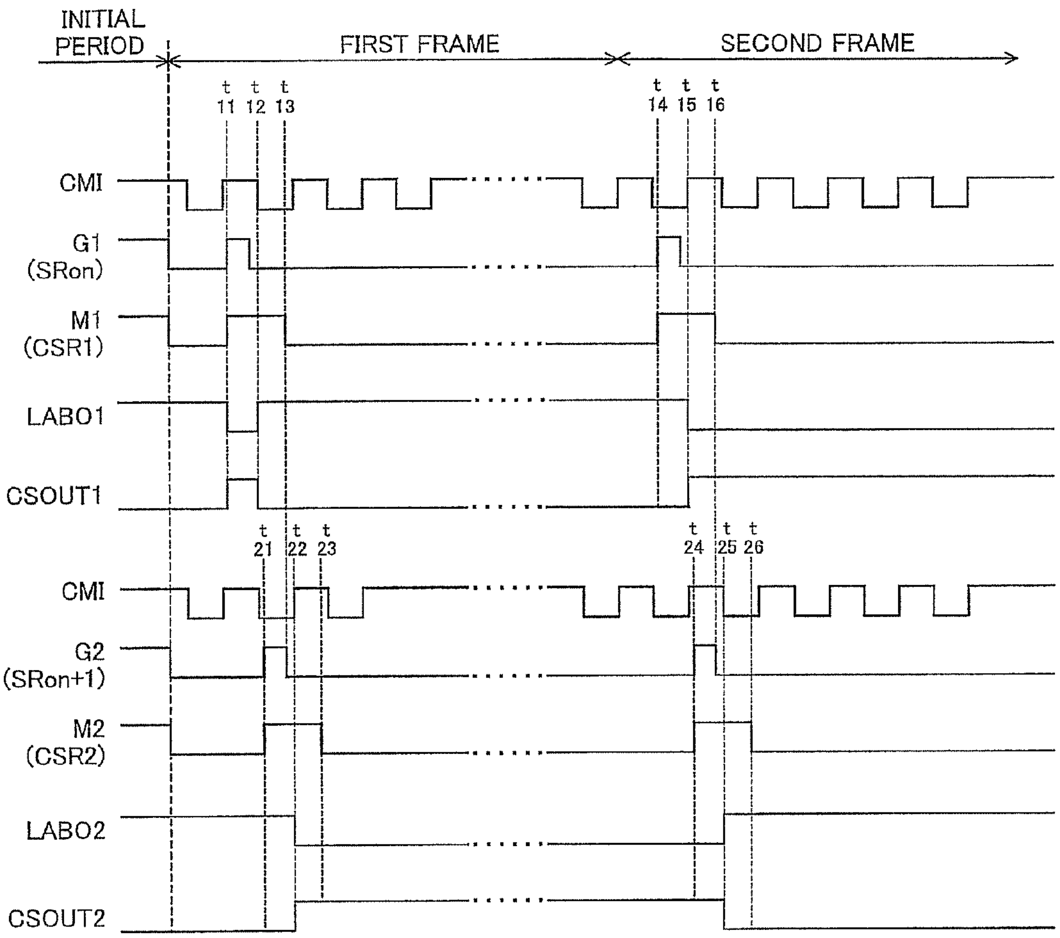
FIG. 10 is a timing chart for explaining operation of the latch circuit shown in FIG. 7.

FIG. 10 is a timing chart showing waveforms of various signals that are inputted to and outputted from the latch circuit CSLn. FIG. 10 shows, as an example, a timing chart in the latch circuit CSL1 in the first row and the latch circuit CSL2 in the second row.

First, changes in waveform of various signals in the first row are described.

In the initial state, as described above, the potential of the CS signal CSOUT1 that the latch circuit CSL1 outputs via its output terminal OUT is retained at a low level.

When, in the first frame, the gate line driving circuit 30 supplies a gate signal G1 to the gate line 12 in the first row, the latch through circuit 4*a* receives an internal signal M1 (signal CSR1) via its clock terminal CK from the shift register circuit SR1. Upon receiving a change in potential of the internal signal M1 (from low to high; t11), the latch through circuit 4*a* transfers an input state of the polarity signal CMI that it received via its input terminal D at the point in time, i.e., transfers a high level, and outputs the change in potential of the polarity signal CMI until the next time when there is a change in potential of the internal signal M1 (from high to low; t13) that the latch through circuit 4*a* receives via its clock terminal CK (i.e., during a period of time in which the internal signal M1 is at a high level; t11 to t13). When the polarity signal CMI changes from a high level to a low level during the period of time in which the internal signal M1 is at a high level (t12), the latch through circuit 4*a* switches its output LABO1 from a low level to a high level. Next, upon receiving a change in potential of the internal signal M1 (from high to low; t13) via its clock terminal CK, the latch through circuit 4*a* latches an input state of the polarity signal CMI that it received at the point in time, i.e., latches a low level. After that, the latch through circuit 4*a* retains its output LABO1 at a high level until there is a change in potential of the internal signal M1 in the second frame (from low to high; t14). The latch through circuit 4*a* sends its output LABO1 to the buffer 4*b*, whereby the latch circuit CSL1 outputs CSOUT1 shown in FIG. 10 via its output terminal OUT.

When, in the second frame, the gate line driving circuit 30 similarly supplies a gate signal G1 to the gate line 12 in the first row, the latch through circuit 4*a* receives an internal signal M1 (signal CSR1) via its clock terminal CK from the shift register circuit SR1. When the internal signal M1 changes from a low level to a high level (t14), the latch through circuit 4*a* transfers an input state of the polarity signal CMI that it received via its input terminal D at the point in time, i.e., transfers a low level. The latch through circuit 4*a* outputs the change in potential of the polarity signal CMI during a period of time in which the internal signal M1 is at a high level (t14 to t16). Therefore, when the polarity signal CMI changes from a low level to a high level (t15), the latch through circuit 4*a* switches its output LABO1 from a high level to a low level. Next, upon receiving a change in potential of the internal signal M1 (from high to low; t16) via its clock terminal CK, the latch through circuit 4*a* latches an input state of the polarity signal CMI that it received at the point in time, i.e., latches a high level. After that, the latch through circuit 4*a* retains its output LABO1 at a low level until there is a change in potential of the internal signal M1 in the third frame. The latch through circuit 4*a* sends its output LABO1 to the buffer 4*b*, whereby the latch circuit CSL1 outputs CSOUT1 shown in FIG. 10 via its output terminal OUT.

The CS signal CSOUT1 thus generated is supplied to the CS bus line 15 of the first row. It should be noted that the output in the third frame takes a waveform obtained by reversing the potential level of the output waveform in the second frame, and in the fourth frame and later, signals identical in output waveform to those in the second and third frames are alternately outputted.

Next, changes in waveform of various signals in the second row are described.

In the initial state, as in the first row, the potential of the CS signal CSOUT2 that the latch circuit CSL2 outputs via its output terminal OUT is retained at a low level.

When, in the first frame, the gate line driving circuit 30 supplies a gate signal G2 to the gate line 12 in the second row, the latch through circuit 4*a* receives an internal signal M2 (signal CSR2) via its clock terminal CK from the shift register circuit SR2. Upon receiving a change in potential of the internal signal M2 (from low to high; t21), the latch through circuit 4*a* transfers an input state of the polarity signal CMI that it received via its input terminal D at the point in time, i.e., transfers a low level, and outputs the change in potential of the polarity signal CMI until the next time when there is a change in potential of the internal signal M2 (from high to low; t23) that the latch through circuit 4*a* receives via its clock terminal CK (i.e., during a period of time in which the internal signal M2 is at a high level; t21 to t23). When the polarity signal CMI changes from a low level to a high level during the period of time in which the internal signal M2 is at a high level (t22), the latch through circuit 4*a* switches its output LABO2 from a high level to a low level. Next, upon receiving a change in potential of the internal signal M2 (from high to low; t23) via its clock terminal CK, the latch through circuit 4*a* latches an input state of the polarity signal CMI that it received at the point in time, i.e., latches a high level. After that, the latch through circuit 4*a* retains its output LABO2 at a low level until there is a change in potential of the internal signal M2 in the second frame (from low to high; t24). The latch through circuit 4*a* sends its output LABO2 to the buffer 4*b*, whereby the latch circuit CSL2 outputs CSOUT2 shown in FIG. 10 via its output terminal OUT.

When, in the second frame, the gate line driving circuit 30 similarly supplies a gate signal G2 to the gate line 12 in the second row, the latch through circuit 4*a* receives an internal signal M2 (signal CSR2) via its clock terminal CK from the shift register circuit SR2. When the internal signal M2 changes from a low level to a high level (t24), the latch through circuit 4*a* transfers an input state of the polarity signal CMI that it received via its input terminal D at the point in time, i.e., transfers a high level. The latch through circuit 4*a* outputs the change in potential of the polarity signal CMI during a period of time in which the internal signal M2 is at a high level (t24 to t26). Therefore, when the polarity signal CMI changes from a high level to a low level (t25), the latch through circuit 4*a* switches its output LABO2 from a low level to a high level. Next, upon receiving a change in potential of the internal signal M2 (from high to low; t26) via its clock terminal CK, the latch through circuit 4*a* latches an input state of the polarity signal CMI that it received at the point in time, i.e., latches a low level. After that, the latch through circuit 4*a* retains its output LABO2 at a high level until there is a change in potential of the internal signal M2 in the third frame. The latch through circuit 4*a* sends its output LABO2 to the buffer 4*b*, whereby the latch circuit CSL2 outputs CSOUT2 shown in FIG. 10 via its output terminal OUT.

The CS signal CSOUT2 thus generated is supplied to the CS bus line 15 of the second row. It should be noted that in the third frame and later, signals identical in output waveform to those in the first and second frames are alternately outputted.

Moreover, the operations in the first and second rows correspond to operations of the latch circuits in each odd-numbered row and each even-numbered row.

Thus, the latch circuits CSL1, CSL2, CSL3, . . . , which correspond to their respective rows, output CS signals so that in all the frames that include the first frame, the potentials of the CS signals at points in time where the gate signals in their corresponding rows fall (at points in time where the TFTs 13 are switched from on to off) differ from one row to an adjacent row. This makes it possible to properly operate the CS bus line driving circuit 40 in all the frames.

In the present liquid crystal display device 1, as described above, a signal (internal signal M) generated inside of the shift register circuit SRn is inputted directly to the latch circuit CSLn of the same row (the nth row). Further, while the internal signal M is always active (at a high level in the example above) in an initial state after turning on of power, in the first frame and later, the internal signal M switches in potential level in accordance with a clock signal inputted to the shift register circuit. With this, in the initial state, a signal that the latch circuit CSLn receives via its input terminal D is fixed at one potential (which is at a low level or a high potential), whereby the output CSOUTn (CS signal) from the latch circuit CSLn is fixed at that one potential (which is at a low level or a high potential), and in the first frame and later, the potentials at points in time where the gate signals in their corresponding rows fall differ from one row to an adjacent row. This allows initializing the CS bus lines in all the rows and properly operating the CS bus line driving circuit 40.

Figure 25:
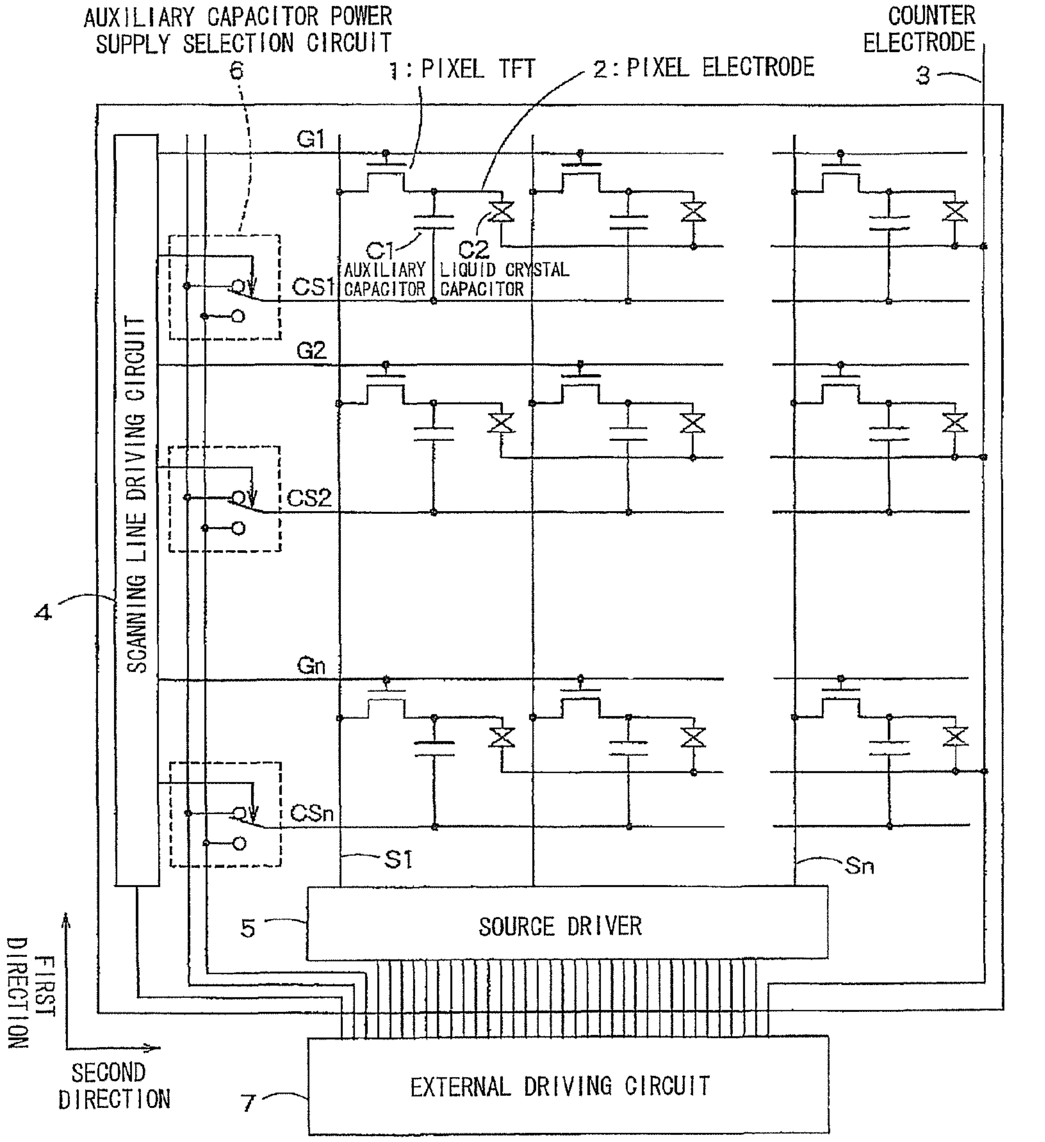
FIG. 25 is a block diagram showing a configuration of a conventional liquid crystal display device.
Figure 26:
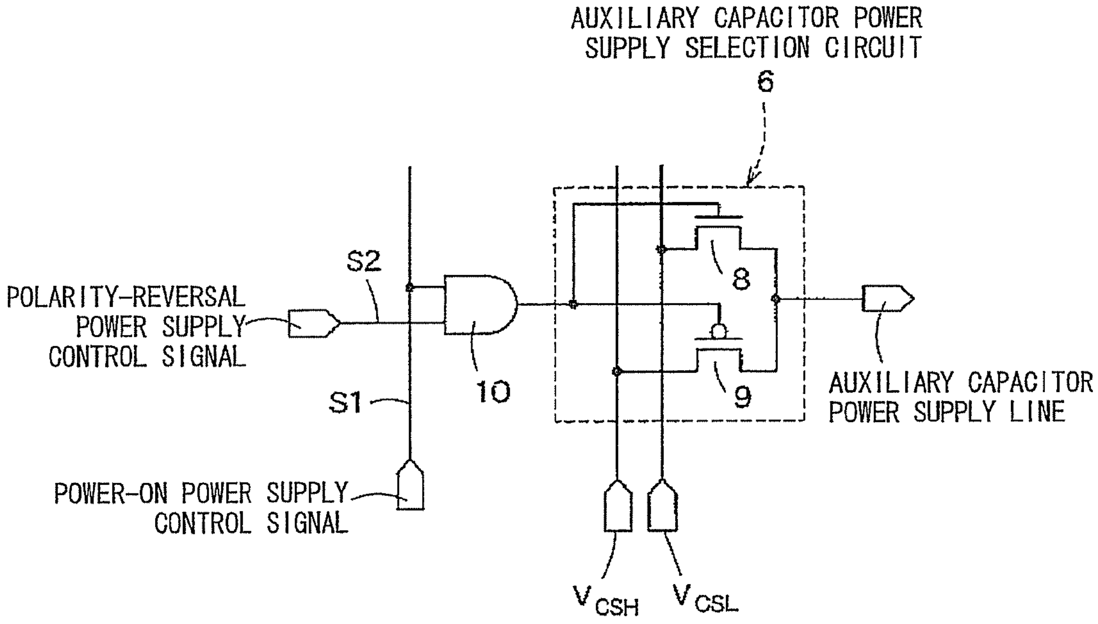
FIG. 26 is a circuit diagram showing a configuration of an auxiliary capacitor power supply selection circuit in the liquid crystal display device shown in FIG. 25.

Further, the foregoing configuration eliminates the need for signal lines or a control circuit for initializing retention capacitor wires (CS bus lines) as shown in FIG. 25, and can therefore make a display driving circuit smaller in circuit area than a conventional configuration. This allows realization of a small liquid crystal display device with high display quality and a liquid crystal display panel with a narrow frame.

(Embodiment 2)

Another embodiment of the present invention is described below with reference to FIGS. 11 through 15. For convenience of explanation, those members which have the same functions as those described above in Embodiment 1 are given the same reference numerals and are not described below. Further, those terms defined in Embodiment 1 are defined in the same way in the present embodiment unless otherwise noted.

Figure 11:
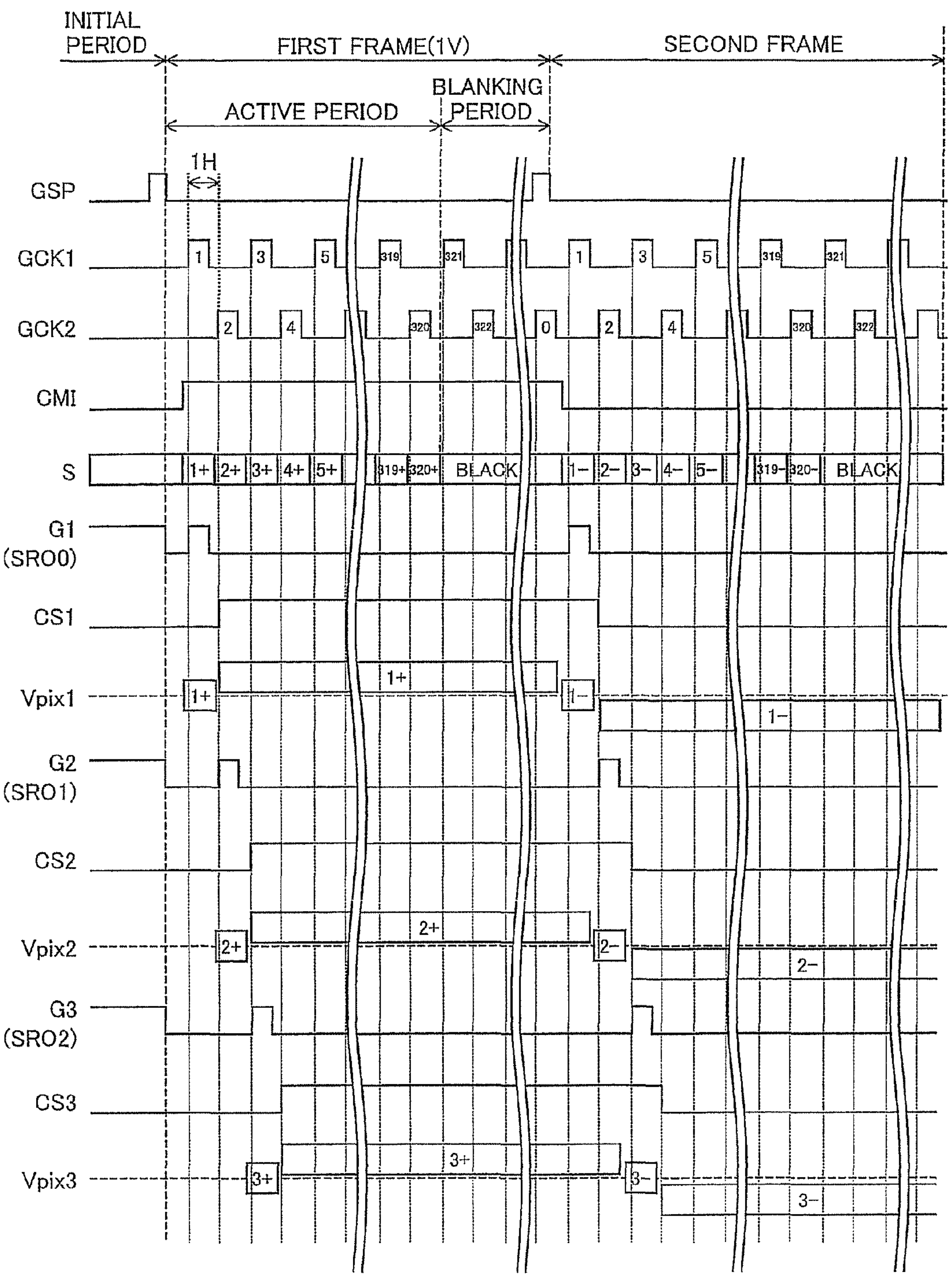
FIG. 11 is a timing chart showing waveforms of various signals of a liquid crystal display device in Embodiment 2.

FIG. 11 is a timing chart showing waveforms of various signals in a liquid crystal display device 1 of Embodiment 2. Embodiment 2 is described by taking as an example a case where frame inversion driving is carried out. The various signals shown in FIG. 11 are the same as those shown in FIG. 3, GSP being a gate start pulse signal, GCK1 (CK) and GCK2 (CKB) being gate clock signals, CMI being a polarity signal. The illustrated timing chart in the liquid crystal display device 1 of Embodiment 2 is different from that of Embodiment 1 in terms of the timing of changes in potential of the polarity signal CMI and the output waveforms of the CS signals and identical to that of Embodiment 1 in other respects.

In Embodiment 2, as shown in FIG. 11, in the initial state, the CS signals CS1, CS2, and CS3 are all fixed at one potential (in FIG. 11, at a low level). In the first frame, the CS signal CS1 in the first row, the CS signal CS2 in the second row, and the CS signal CS3 in the third row switch from a low level to a high level after falls in their corresponding gate signals G1, G2, and G3, respectively. In the second frame, the CS signal CS1 in the first row, the CS signal CS2 in the second row, and the CS signal CS3 in the third row switch from a high level to a low level after falls in their corresponding gate signals G1, G2, and G3, respectively.

It should be noted that the source signal S is a signal which has amplitude corresponding to a gray scale represented by a video signal and which reverses its polarity every single frame. Further, since it is assumed in FIG. 11 that a uniform picture is displayed, the amplitude of the source signal S is constant. Then, the CS signals CS1, CS2, and CS3 are reversed after their corresponding gate signals G1, G2, and G3 fall, and take such waveforms that adjacent rows are identical in direction of reversal to each other.

Thus, the potentials of the CS signals at points in time where the gate signals fall in the first frame become negative in polarity in all the rows, and the potentials of the CS signals at points in time where the gate signals fall in the second frame become positive in polarity in all the rows. Therefore, since the potentials Vpix1, Vpix2, and Vpix3 of the pixel electrodes 14 are all properly shifted by the CS signals CS1, CS2, and CS3, respectively, inputting of source signals S of the same gray scale causes the positive and negative potential differences between the potential of the counter electrode and the shifted potential of each of the pixel electrodes 14 to be equal to each other. In the result, CC driving can be properly realized in frame inversion driving.

Figure 12:
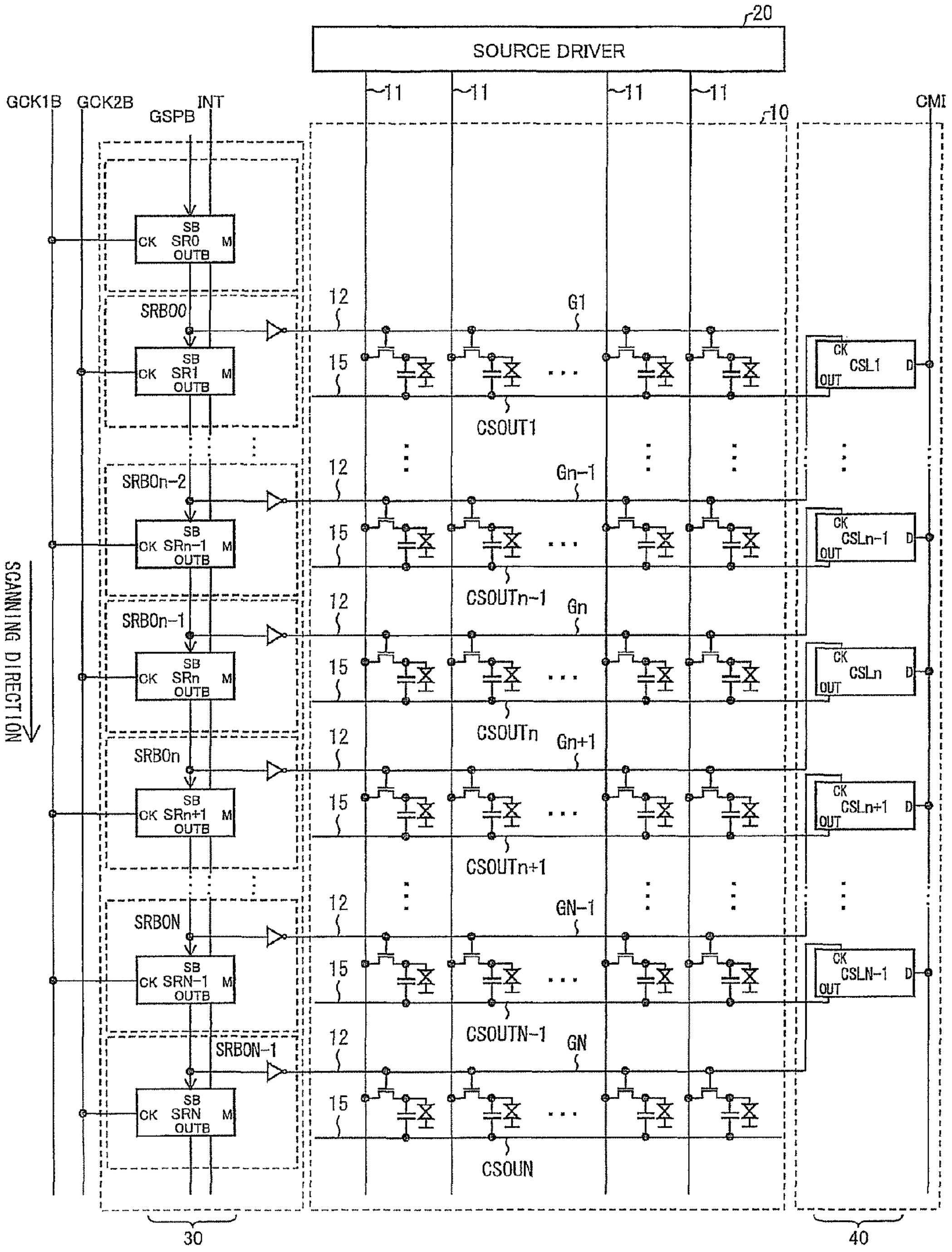
FIG. 12 is a block diagram showing a configuration of a gate line driving circuit and a CS bus line driving circuit in Embodiment 2.

A specific configuration of the gate line driving circuit 30 and the CS bus line driving circuit 40 for achieving the aforementioned control is described here. FIG. 12 shows a configuration of the gate line driving circuit 30 and the CS bus line driving circuit 40. In the following, for convenience of explanation, the row (line) (next row) following the nth row in a scanning direction (indicated by an arrow in FIG. 4) is represented as the (n+1)th row, and the row (previous row) immediately preceding the nth row in the scanning direction is represented as the (n−1)th row.

As shown in FIG. 12, the gate line driving circuit 30 has a plurality of shift register circuits SR corresponding to their respective rows, and the CS bus line driving circuit 40 has a plurality of retaining circuits (latch circuits, memory circuits) CSL corresponding to their respective rows. The gate line driving circuit 30 is provided on one side of the liquid crystal display panel 10, and the CS bus line driving circuit 40 is provided on the other side of the liquid crystal display panel 10. For convenience of explanation, the shift register circuits SRn−1, SRn, and SRn+1 and the latch circuits CSLn−1, CSLn, and CSLn+1, which correspond to the (n−1)th, nth, and (n+1)th rows respectively, are taken as an example here.

The shift register circuit SRn−1 in the (n−1)th row receives the gate clock signal GCK1 via its clock terminal CK from the control circuit 50 (see FIG. 1), and receives a shift register output SRBOn−2 from the previous row (the (n−2)th row) via its input terminal SB as a set signal for the shift register circuit SRn−1. The shift register circuit SRn−1 has its output terminal OUTB connected to the input terminal SB of the shift register circuit SRn of the next row (the nth row). This allows the shift register circuit SRn−1 to output a shift register output SRBOn−1 via its output terminal OUTB to the shift register circuit SRn. The shift register circuit SRn−1 has its output terminal OUTS connected to the clock terminal CK of the latch circuit CSLn−1 of the current row (the (n−1)th row) via a buffer. This allows the shift register circuit SRn−1 to input its output signal SRBOn−1 (which corresponds to the gate signal Gn) to the latch circuit CSLn−1.

Further, the shift register output SRBOn−2 from the previous row (the (n−2)th row) is both inputted to the shift register circuit SRn−1 and outputted as a gate signal Gn−1 to the gate line 12 of the current row (the (n−1)th row) via a buffer. Further, the shift register circuit SRn−1 is supplied with a power supply (VDD).

The latch circuit CSLn−1 in the (n−1)th row receives the polarity signal CMI from the control circuit 50 (see FIG. 1) and the gate signal Gn. The latch circuit CSLn−1 has its output terminal OUT connected to the CS bus line 15 of the current row (the (n−1)th row). This allows the latch circuit CSLn−1 to output a CS signal CSOUTn−1 via its output terminal OUT to the CS bus line 15 of the current row.

The shift register circuit SRn in the nth row receives the gate clock signal GCK2 via its clock terminal CK from the control circuit 50 (see FIG. 1), and receives a shift register output SRBOn−1 from the previous row (the (n−1)th row) via its input terminal SB as a set signal for the shift register circuit SRn. The shift register circuit SRn has its output terminal OUTB connected to the input terminal SB of the shift register circuit SRn+1 of the next row (the (n+1)th row). This allows the shift register circuit SRn to output a shift register output SRBOn via its output terminal OUTB to the shift register circuit SRn+1. The shift register circuit SRn has its output terminal OUTB connected to the clock terminal CK of the latch circuit CSLn of the current row (the nth row) via a buffer. This allows the shift register circuit SRn to input its output signal SRBOn (which corresponds to the gate signal Gn+1) to the latch circuit CSLn.

Further, the shift register output SRBOn−1 from the previous row (the (n−1)th row) is both inputted to the shift register circuit SRn and outputted as a gate signal Gn to the gate line 12 of the current row (the nth row) via a buffer. Further, the shift register circuit SRn is supplied with the power supply (VDD).

The latch circuit CSLn in the nth row receives the polarity signal CMI from the control circuit 50 (see FIG. 1) and the gate signal Gn+1. The latch circuit CSLn has its output terminal OUT connected to the CS bus line 15 of the current row (the nth row). This allows the latch circuit CSLn to output a CS signal CSOUTn via its output terminal OUT to the CS bus line 15 of the current row.

The shift register circuit SRn+1 in the (n+1)th row receives the gate clock signal GCK1 via its clock terminal CK from the control circuit 50 (see FIG. 1), and receives a shift register output SRBOn from the previous row (the nth row) via its input terminal SB as a set signal for the shift register circuit SRn+1. The shift register circuit SRn+1 has its output terminal OUTB connected to the input terminal SB of the shift register circuit SRn+2 of the next row (the (n+2)th row). This allows the shift register circuit SRn+1 to output a shift register output SRBOn+1 via its output terminal OUTB to the shift register circuit SRn+2. The shift register circuit SRn+1 has its output terminal OUTB connected to the clock terminal CK of the latch circuit CSLn+1 of the current row (the (n+1)th row) via buffer. This allows the shift register circuit SRn+1 to input its output signal SRBOn+1 (which corresponds to the gate signal Gn+2) to the latch circuit CSLn+1.

Further, the shift register output SRBOn from the previous row (the nth row) is both inputted to the shift register circuit SRn+1 and outputted as a gate signal Gn+1 to the gate line 12 of the current row (the (n+1)th row) via a buffer. Further, the shift register circuit SRn+1 is supplied with the power supply (VDD).

The latch circuit CSLn+1 in the (n+1)th row receives the polarity signal CMI from the control circuit 50 (see FIG. 1) and the gate signal Gn+2. The latch circuit CSLn+1 has its output terminal OUT connected to the CS bus line 15 of the current row (the (n+1)th row). This allows the latch circuit CSLn+1 to output a CS signal CSOUTn+1 via its output terminal OUT to the CS bus line 15 of the current row.

Figure 6:
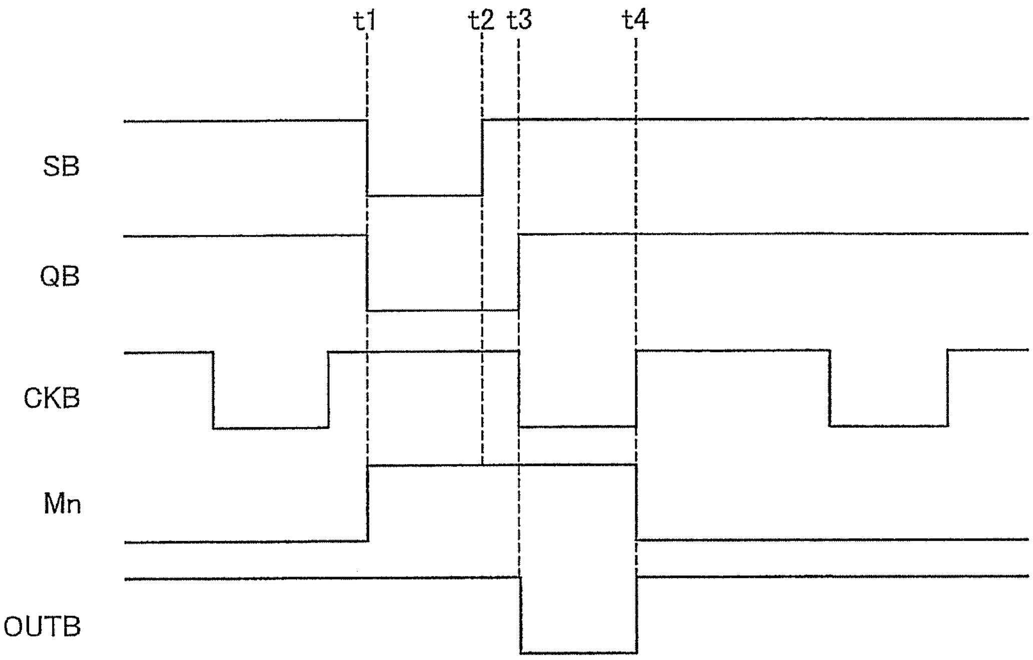
FIG. 6 is a timing chart showing waveforms of various signals that are inputted to and outputted from the shift register circuit shown in FIG. 5.

Each shift register circuit SR is identical in configuration to that of Embodiment 1 shown in FIG. 5, and its operation is represented by waveforms shown in FIG. 6. A description of each shift register circuit SR is omitted here.

Figure 13:
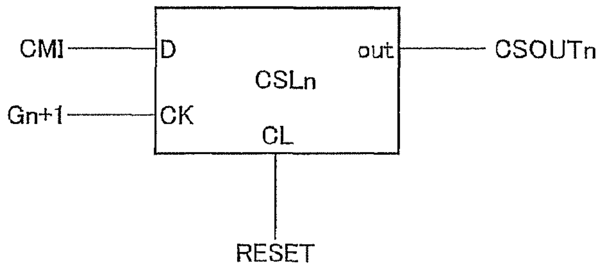
FIG. 13 shows a configuration of a logic circuit (latch circuit) in Embodiment 2.

Operation of each latch circuit CSL is described below with reference to FIG. 13.

The latch circuit CSLn receives the gate signal Gn+1 via its clock terminal CK (see FIG. 12) as described above. The latch circuit CSLn receives the polarity signal CMI via its input terminal D from the control circuit 50 (see FIG. 1). This allows the latch circuit CSLn to output an input state of the polarity signal CMI as a CS signal CSOUTn in accordance with a change in potential level of the gate signal Gn+1 (from a low level to a high level or from a high level to a low level), and the CS signal CSOUTn indicates the change in potential level. Specifically, when the potential level of the gate signal Gn+1 that the latch circuit CSLn receives via its clock terminal CK is a high level, the latch circuit CSLn outputs an input state (low level or high level) of the polarity signal CMI that it receives via its input terminal D. When the potential level of the gate signal Gn+1 that the latch circuit CSLn receives via its clock terminal CK has changed from a high level to a low level, the latch circuit CSLn latches the input state (low level or high level) of the polarity signal CMI that it received via its input terminal D at the time of change, and keeps the latched state until the next time when the potential level of the gate signal Gn+1 that the latch circuit CSLn receives via its clock terminal CK is raised to a high level. Then, the latch circuit CSLn outputs the latched state as the CS signal CSOUTn, which indicates the change in potential level, via its output terminal OUT.

Figure 14:
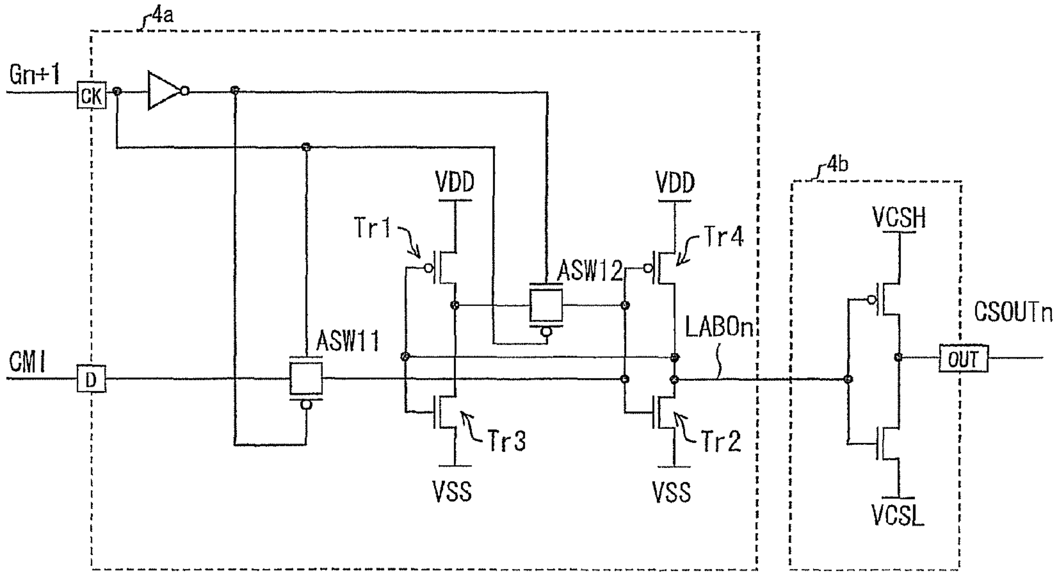
FIG. 14 is a circuit diagram of the latch circuit shown in FIG. 13.

It should be noted that the latch circuit CSLn can be specifically achieved, for example, by a configuration shown in the circuit diagram of FIG. 14. As shown in FIG. 14, the latch circuit CSLn is configured to include a latch through circuit 4*a* and a buffer 4*b*. The latch through circuit 4*a* is constituted by four transistors, two analog switching circuits SW11 and SW12, and one inverter, and the buffer 4*b* is constituted by two transistors.

(As to an Initial Operation)

Figure 15:
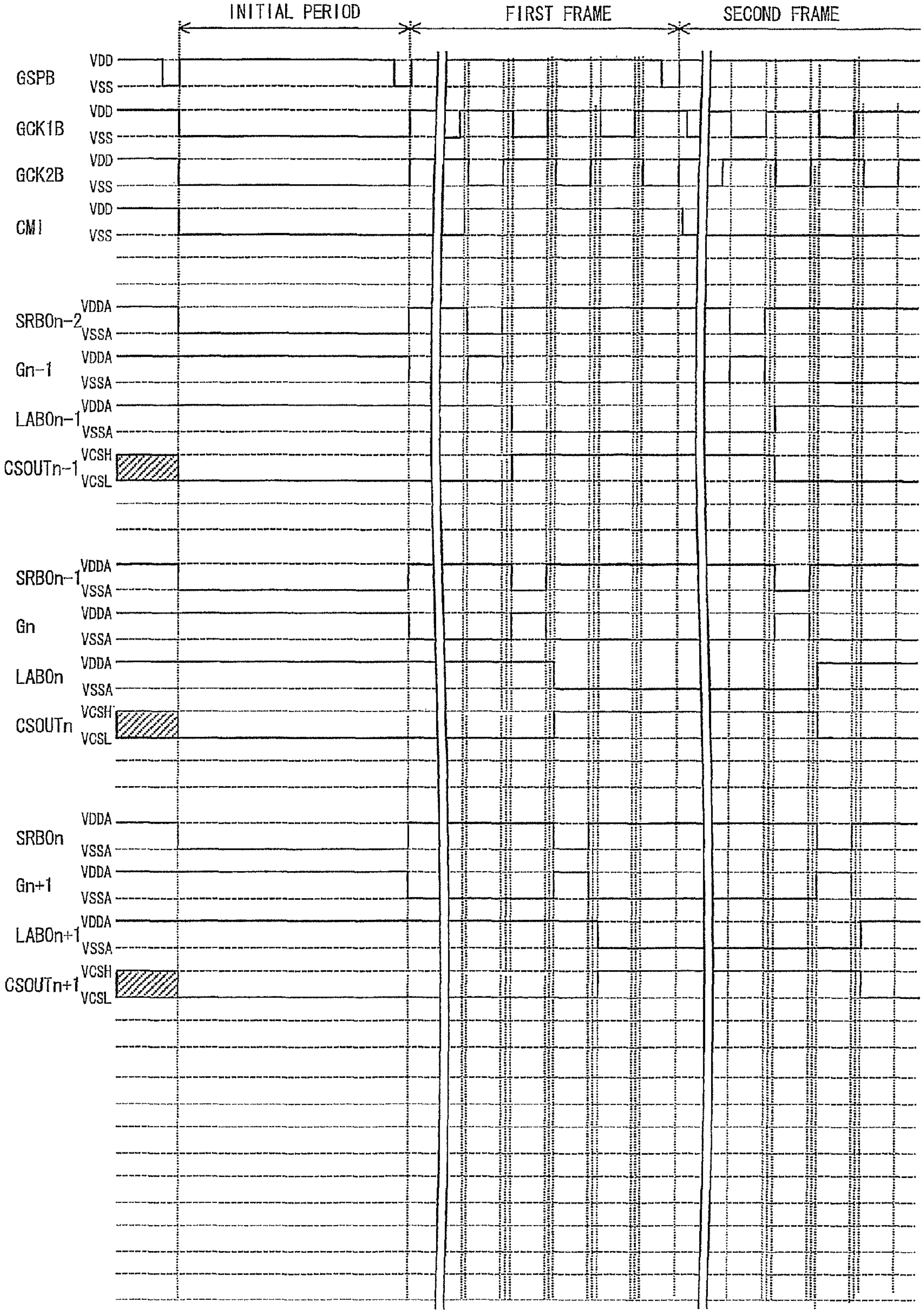
FIG. 15 is a timing chart showing waveforms of various signals that are inputted to and outputted from the latch circuit shown in FIG. 13.

FIG. 15 is a timing chart showing waveforms of various signals that are inputted to and outputted from the shift register circuits SR and the D latch circuits CSL. FIG. 15 shows waveforms during an initial operation after the liquid crystal display device 1 has been turned on, an operation in the first vertical scanning period (first frame) of a display picture, and an operation in the next vertical scanning period (second frame). The initial operation is explained here.

In an initial state (initial period) after turning on of the liquid crystal display device 1, the clock signals GCK1B and GCK2B and the polarity signal CMI are set to a low level. Specifically, when the liquid crystal display device 1 has been turned on, the control circuit 50 (see FIG. 1) outputs control signals such as GSPB in accordance with which GCK1B, GCK2B, and CMI are outputted at a low level. At the same time, GSPB is inputted to the shift register circuit SR0 of the first stage (the zeroth row).

It should be noted here that, as shown in FIG. 5, the shift register circuit SRn outputs CKB or Vdd in accordance with the internal signal Mn, which controls the analog switching circuits SW1 and SW2. That is, while the internal signal Mn is active (at a high level), the analog switching circuit SW1 is turned on so that CKB is kept being outputted. Moreover, while the set signal SB, which is inputted to the shift register circuit SRn, is active, the internal signal Mn is maintained in an active state (see FIG. 6). Therefore, while an active signal is being inputted to the shift register circuit SRn, the internal signal Mn becomes active, and CKB is kept being outputted. Since, in the initial state, CKB is set to a low level, a low-level signal is outputted while an active signal is being inputted to the shift register circuit SRn.

With this configuration, at the same time as GSPB is inputted to the first-stage shift register circuit SR0, a low-level signal is inputted to each shift register circuit SR and the internal signal M and the output signal OUTB (SRBO) become active. It should be noted that an internal delay in signal wiring or the like is omitted for the sake of convenience.

In the initial state, as described above, the shift register circuit SR at each stage outputs the clock signal CKB at a low level. It should be noted that the clock signal CKB outputted at a low level from the register circuit SR at each stage is supplied to the corresponding gate line GL via a buffer (see FIG. 12), whereby all the gate lines GL become active. For example, by supplying the counter electrode potential Vcom to each source line here, the potentials of all the pixel electrodes in the initial state can be fixed at Vcom.

During the above operation, the signal (gate signal Gn+1) outputted from the shift register circuit SRn via a buffer is inputted to the latch circuit CSLn shown in FIG. 14. When the latch through circuit 4*a*, which constitutes the latch circuit CSLn, receives an active (high-level) gate signal Gn+1 via its clock terminal CK, the analog switching circuit SW11 is turned on, and the polarity signal CMI (at a low level) inputted to the input terminal D is inputted to the transistor Tr1 so that the transistor Tr1 is turned on, whereby a signal LABOn is outputted at a high level (Vdd) (see FIG. 15). When the signal LABOn outputted from the latch through circuit 4*a* is inputted to the buffer 4*b*, the transistor Tr2 is turned on, whereby the signal CSOUTn is outputted at a low level (Vss) (see FIG. 15).

When the latch through circuit 4*a* receives a non-active (low-level) gate signal Gn+1 via its clock terminal CK, the analog switching circuit SW11 is turned off and the analog switching circuit SW12 is turned on. This causes the analog switching circuit SW11 to latch the polarity signal CMI (at a low level) at the point in time where it was turned off, whereby the signal CSOUTn is outputted at a low level (Vss) (see FIG. 15).

In the latch circuit CSLn, as described above, the output signal CSOUTn switches in potential in accordance with a change in potential of the polarity signal CMI while an active signal is being inputted from the shift register circuit SRn. Therefore, since, in the initial state, the polarity signal CMI is set to a low level, the output signal CSOUTn from the latch circuit CSLn in each row is fixed at a low level. It should be noted that in a case where the control circuit 50 (see FIG. 1) is set to output the polarity signal CMI at a high level, the output signal CSOUTn from the latch circuit CSLn in each row is fixed at a high level. This eliminates an indefinite state (indicated by shaded areas in FIG. 15) immediately after turning on of power, and at the beginning of the start frame (first frame) of a display picture, the potential of each CS signal can be fixed at one side (in the example shown in FIG. 15, a low level). This allows elimination of a display problem after turning on of power and before the beginning of the first frame.

(As to Operations in the First and Second Frames)

The following explains operations in the first and second frames with reference to FIG. 15. Operation of the shift register circuit SRn and latch circuit CSLn in the nth row is mainly explained here.

In the initial state, as described above, the potential of the CS signal CSOUTn that the latch circuit CSLn outputs via its output terminal OUT is retained at a low level.

In the first frame, the latch through circuit 4*a* receives a gate signal Gn+1 via its clock terminal CK from the shift register circuit SRn. Upon receiving a change in potential of the gate signal Gn+1 (from low to high), the latch through circuit 4*a* transfers an input state of the polarity signal CMI that it received via its input terminal D at the point in time, i.e., transfers a high level, and outputs the change in potential of the polarity signal CMI until there is a change in potential of the gate signal Gn+1 (from high to low) that the latch through circuit 4*a* receives via its clock terminal CK (i.e., during a period of time in which the gate signal Gn+1 is at a high level). Since the polarity signal CMI is at a high level during the period of time in which the gate signal Gn+1 is at a high level, the latch through circuit 4*a* produces its output LABOn at a low level. Next, upon receiving a change in potential of the gate signal Gn+1 (from high to low) via its clock terminal CK, the latch through circuit 4*a* latches an input state of the polarity signal CMI that it received at the point in time, i.e., latches a high level. After that, the latch through circuit 4*a* retains its output LABOn at a low level until there is a change in potential of the gate signal Gn+1 in the second frame (from low to high). The latch through circuit 4*a* sends its output LABOn to the buffer 4*b*, whereby the latch circuit CSLn outputs CSOUTn (at a high level) shown in FIG. 15 via its output terminal OUT.

Similarly, in the second frame, the latch through circuit 4*a* receives a gate signal Gn+1 via its clock terminal CK from the shift register circuit SRn. When the gate signal Gn+1 changes from a low level to a high level, the latch through circuit 4*a* transfers an input state of the polarity signal CMI that it received via its input terminal D at the point in time, i.e., transfers a low level. Since the polarity signal CMI is at a low level during the period of time in which the gate signal Gn+1 is at a high level, the latch through circuit 4*a* produces its output LABOn at a high level. Next, upon receiving a change in potential of the gate signal Gn+1 (from high to low) via its clock terminal CK, the latch through circuit 4*a* latches an input state of the polarity signal CMI that it received at the point in time, i.e., latches a low level. After that, the latch through circuit 4*a* retains its output LABOn at a high level until there is a change in potential of the gate signal Gn+1 in the third frame. The latch through circuit 4*a* sends its output LABOn to the buffer 4*b*, whereby the latch circuit CSLn outputs CSOUTn (at a low level) shown in FIG. 15 via its output terminal OUT.

The CS signal CSOUTn thus generated is supplied to the CS bus line 15 of the nth row. It should be noted that in the third frame and later, signals identical in output waveform to those in the first and second frames are alternately outputted. Further, since the present embodiment adopts frame inversion driving, the same operation as that described above is carried out in each row.

This makes it possible, in a frame inversion driven liquid crystal display device, to properly operate the CS bus line driving circuit 40 in all the frames.

Further, the foregoing configuration eliminates the need for signal lines or a control circuit for initializing CS bus lines as shown in FIG. 25, and can therefore make a display driving circuit smaller in circuit area than a conventional configuration. This allows realization of a small liquid crystal display device with high display quality and a liquid crystal display panel with a narrow frame.

(Embodiment 3)

Another embodiment of the present invention is described below with reference to FIGS. 16 through 20. For convenience of explanation, those members which have the same functions as those described above in Embodiment 1 are given the same reference numerals and are not described below. Further, those terms defined in Embodiment 1 are defined in the same way in the present embodiment unless otherwise noted.

Figure 16:
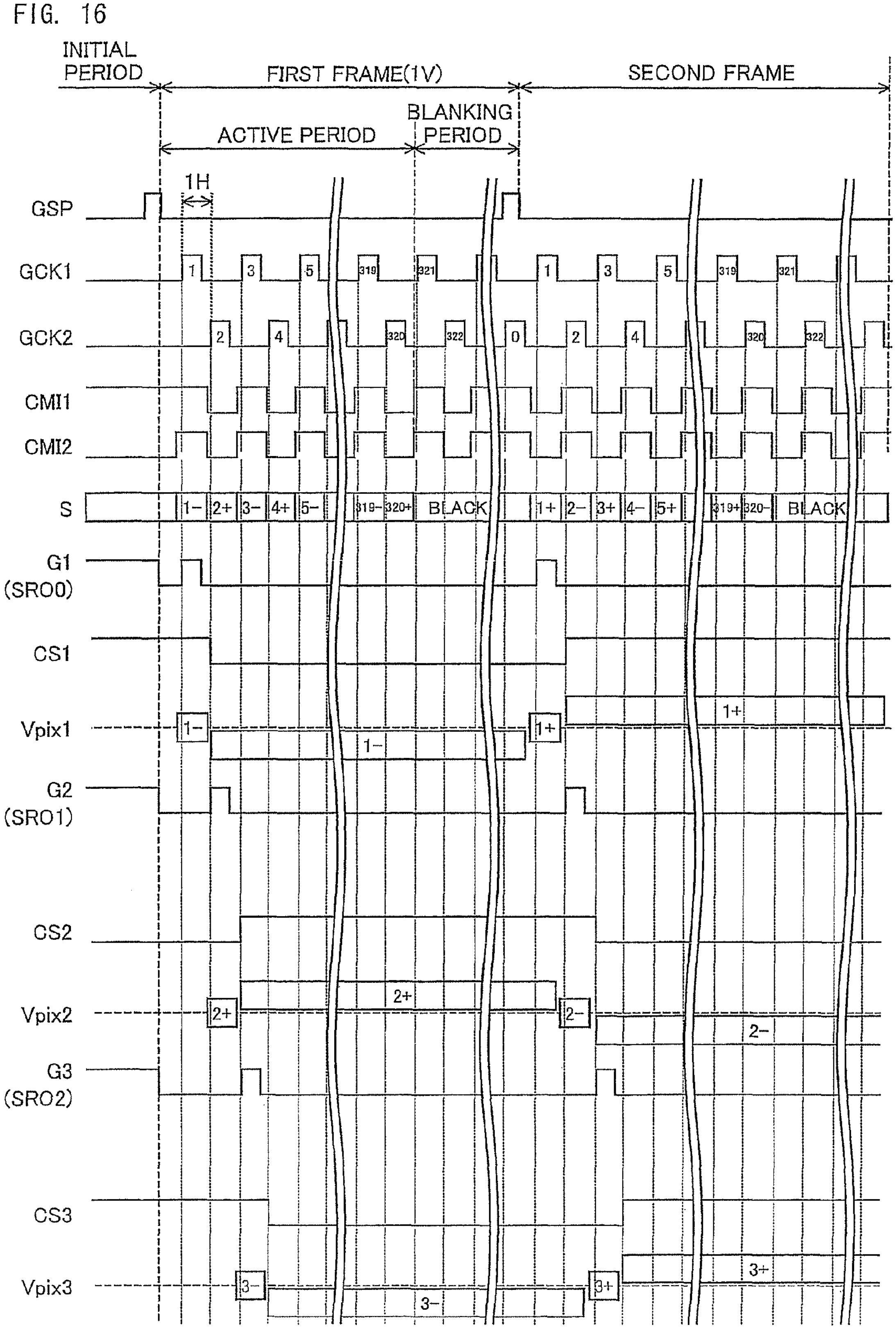
FIG. 16 is a timing chart showing waveforms of various signals of a liquid crystal display device in Embodiment 3.

FIG. 16 is a timing chart showing waveforms of various signals in a liquid crystal display device 1 of Embodiment 3. In Embodiment 3, 1-line (1H) inversion driving is carried out in the configuration of Embodiment 2. The various signals shown in FIG. 16 are the same as those shown in FIG. 3, GSP being a gate start pulse signal, GCK1 (CK) and GCK2 (CKB) being gate clock signals, CMI1 and CMI2 being polarity signals. In Embodiment 3, two polarity signals CMI1 and CMI2 different in phase from each other are inputted.

In Embodiment 3, as shown in FIG. 16, in the initial state, the CS signal CS1 is fixed at a high level, and the CS signal CS2 is fixed at a low level, and the CS3 is fixed at a high level. In the first frame, the CS signal CS1 in the first row and the CS signal CS3 in the third row switch from a high level to a low level in synchronization with rising edges in the gate signals G2 and G4 in the next rows, respectively, and the CS signal CS2 in the second row switches from a low level to a high level in synchronization with a rising edge in the gate signal G3 in the next row. Therefore, the potential of a CS signal in each row at a point in time where its corresponding gate signal falls is different from the potential of a CS signal in an adjacent row at a point in time where its corresponding gate signal falls. For example, the CS signal CS1 is at a high level at a point in time where its corresponding gate signal G1 falls, and the CS signal CS2 is at a low level at a point in time where its corresponding gate signal G2 falls, and the CS signal CS3 is at a high level at a point in time where its corresponding gate signal G3 falls.

It should be noted that the source signal S is a signal which has amplitude corresponding to a gray scale represented by a video signal and which reverses its polarity every 1H period.

This driving allows fixing the potential of each CS signal in an initial state to be fixed at one side (which is a low level or a high level) for each row, thus allowing elimination of a display problem in the initial period. Further, in the first frame and later, the potential of each pixel electrode can be properly shifted.

Figure 17:
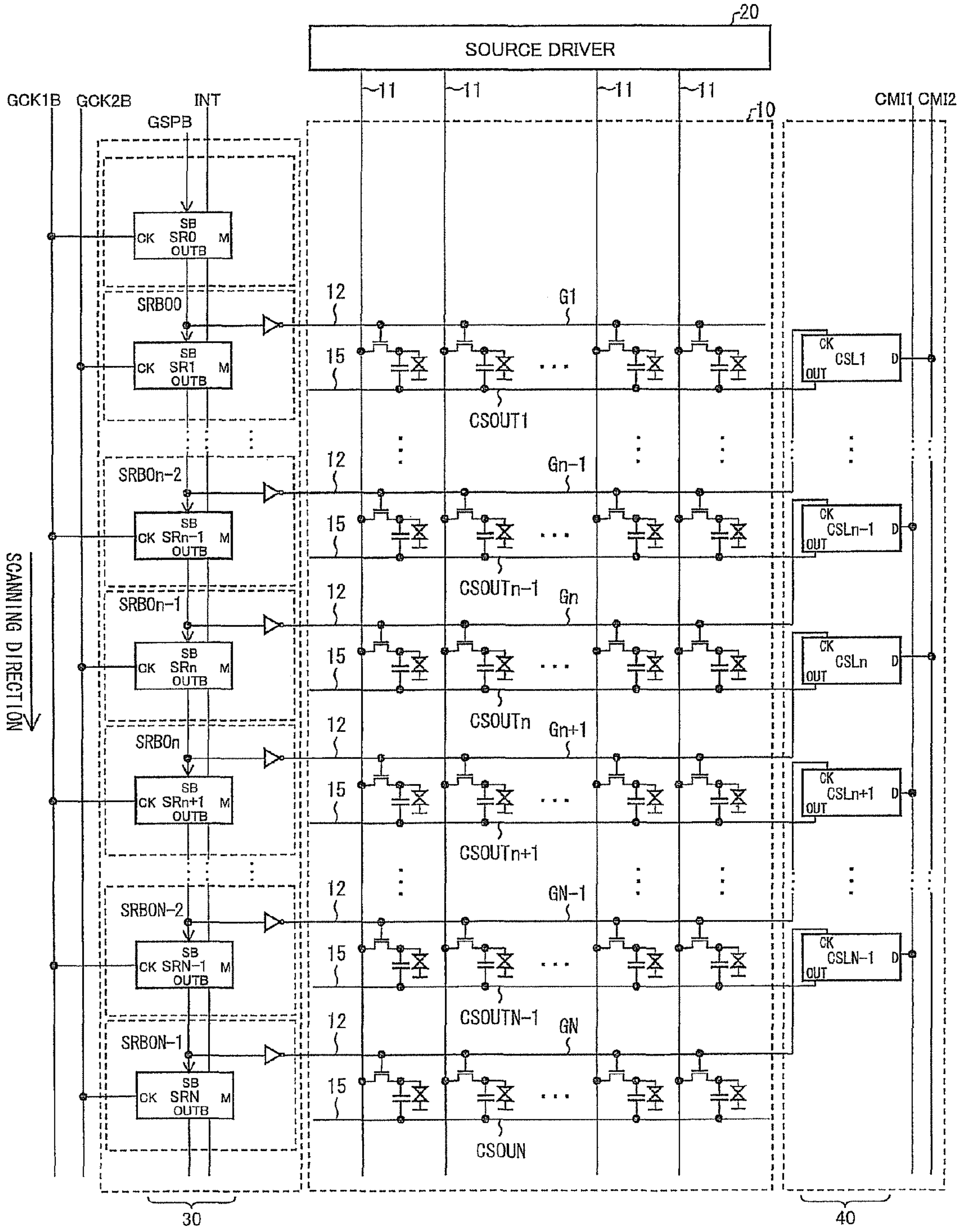
FIG. 17 is a block diagram showing a configuration of a gate line driving circuit and a CS bus line driving circuit in Embodiment 3.

A specific configuration of the gate line driving circuit 30 and the CS bus line driving circuit 40 for achieving the aforementioned control is described here. FIG. 17 shows a configuration of the gate line driving circuit 30 and the CS bus line driving circuit 40. In the following, for convenience of explanation, the row (line) (next row) following the nth row in a scanning direction (indicated by an arrow in FIG. 4) is represented as the (n+1)th row, and the row (previous row) immediately preceding the nth row in the scanning direction is represented as the (n−1)th row.

As shown in FIG. 17, the gate line driving circuit 30 has a plurality of shift register circuits SR corresponding to their respective rows, and the CS bus line driving circuit 40 has a plurality of retaining circuits (latch circuits, memory circuits) CSL corresponding to their respective rows. The gate line driving circuit 30 is provided on one side of the liquid crystal display panel 10, and the CS bus line driving circuit 40 is provided on the other side of the liquid crystal display panel 10. For convenience of explanation, the shift register circuits SRn−1, SRn, and SRn+1 and the latch circuits CSLn−1, CSLn, and CSLn+1, which correspond to the (n−1)th, nth, and (n+1)th rows respectively, are taken as an example here.

The shift register circuit SRn−1 in the (n−1)th row receives the gate clock signal GCK1 via its clock terminal CK from the control circuit 50 (see FIG. 1), and receives a shift register output SRBOn−2 from the previous row (the (n−2)th row) via its input terminal SB as a set signal for the shift register circuit SRn−1. The shift register circuit SRn−1 has its output terminal OUTB connected to the input terminal SB of the shift register circuit SRn of the next row (the nth row). This allows the shift register circuit SRn−1 to output a shift register output SRBOn−1 via its output terminal OUTB to the shift register circuit SRn. The shift register circuit SRn−1 has its output terminal OUTB connected to the clock terminal CK of the latch circuit CSLn−1 of the current row (the (n−1)th row) via a buffer. This allows the shift register circuit SRn−1 to input its output signal SRBOn−1 (which corresponds to the gate signal Gn) to the latch circuit CSLn−1.

Further, the shift register output SRBOn−2 from the previous row (the (n−2)th row) is both inputted to the shift register circuit SRn−1 and outputted as a gate signal Gn−1 to the gate line 12 of the current row (the (n−1)th row) via a buffer. Further, the shift register circuit SRn−1 is supplied with a power supply (VDD).

The latch circuit CSLn−1 in the (n−1)th row receives the polarity signal CMI1 from the control circuit 50 (see FIG. 1) and the gate signal Gn. The latch circuit CSLn−1 has its output terminal OUT connected to the CS bus line 15 of the current row (the (n−1)th row). This allows the latch circuit CSLn−1 to output a CS signal CSOUTn−1 via its output terminal OUT to the CS bus line 15 of the current row.

The shift register circuit SRn in the nth row receives the gate clock signal GCK2 via its clock terminal CK from the control circuit 50 (see FIG. 1), and receives a shift register output SRBOn−1 from the previous row (the (n−1)th row) via its input terminal SB as a set signal for the shift register circuit SRn. The shift register circuit SRn has its output terminal OUTB connected to the input terminal SB of the shift register circuit SRn+1 of the next row (the (n+1)th row). This allows the shift register circuit SRn to output a shift register output SRBOn via its output terminal OUTB to the shift register circuit SRn+1. The shift register circuit SRn has its output terminal OUTB connected to the clock terminal CK of the latch circuit CSLn of the current row (the nth row) via a buffer. This allows the shift register circuit SRn to input its output signal SRBOn (which corresponds to the gate signal Gn+1) to the latch circuit CSLn.

Further, the shift register output SRBOn−1 from the previous row (the (n−1)th row) is both inputted to the shift register circuit SRn and outputted as a gate signal Gn to the gate line 12 of the current row (the nth row) via a buffer. Further, the shift register circuit SRn is supplied with a power supply (VDD).

The latch circuit CSLn in the nth row receives the polarity signal CMI2 from the control circuit 50 (see FIG. 1) and the gate signal Gn+1. The latch circuit CSLn has its output terminal OUT connected to the CS bus line 15 of the current row (the nth row). This allows the latch circuit CSLn to output a CS signal CSOUTn via its output terminal OUT to the CS bus line 15 of the current row.

The shift register circuit SRn+1 in the (n+1)th row receives the gate clock signal GCK1 via its clock terminal CK from the control circuit 50 (see FIG. 1), and receives a shift register output SRBOn from the previous row (the nth row) via its input terminal SB as a set signal for the shift register circuit SRn+1. The shift register circuit SRn+1 has its output terminal OUTB connected to the input terminal SB of the shift register circuit SRn+2 of the next row (the (n+2)th row). This allows the shift register circuit SRn+1 to output a shift register output SRBOn+1 via its output terminal OUTB to the shift register circuit SRn+2. The shift register circuit SRn+1 has its output terminal OUTB connected to the clock terminal CK of the latch circuit CSLn+1 of the current row (the (n+1)th row) via a buffer. This allows the shift register circuit SRn+1 to input its output signal SRBOn+1 (which corresponds to the gate signal Gn+2) to the latch circuit CSLn+1.

Further, the shift register output SRBOn from the previous row (the nth row) is both inputted to the shift register circuit SRn+1 and outputted as a gate signal Gn+1 to the gate line 12 of the current row (the (n+1)th row) via a buffer. Further, the shift register circuit SRn+1 is supplied with the power supply (VDD).

The latch circuit CSLn+1 in the (n+1)th row receives the polarity signal CMI1 from the control circuit 50 (see FIG. 1) and the gate signal Gn+2. The latch circuit CSLn+1 has its output terminal OUT connected to the CS bus line 15 of the current row (the (n+1)th row). This allows the latch circuit CSLn+1 to output a CS signal CSOUTn+1 via its output terminal OUT to the CS bus line 15 of the current row.

Each shift register circuit SR is identical in configuration to that of Embodiment 1 shown in FIG. 5, and its operation is represented by waveforms shown in FIG. 6. A description of each shift register circuit SR is omitted here.

Figure 18:
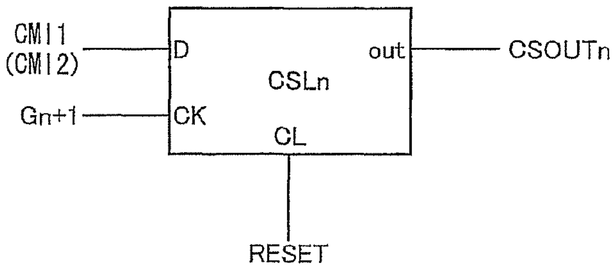
FIG. 18 shows a configuration of a logic circuit (latch circuit) in Embodiment 3.

Operation of each latch circuit CSL is described below with reference to FIG. 18.

The latch circuit CSLn receives the gate signal Gn+1 via its clock terminal CK (see FIG. 17) as described above. The latch circuit CSLn receives the polarity signal CMI2 via its input terminal D from the control circuit 50 (see FIG. 1). This allows the latch circuit CSLn to output an input state of the polarity signal CMI2 as a CS signal CSOUTn in accordance with a change in potential level of the gate signal Gn+1 (from a low level to a high level or from a high level to a low level), and the CS signal CSOUTn indicates the change in potential level. Specifically, when the potential level of the gate signal Gn+1 that the latch circuit CSLn receives via its clock terminal CK is a high level, the latch circuit CSLn outputs an input state (low level or high level) of the polarity signal CMI2 that is receives via its input terminal D. When the potential level of the gate signal Gn+1 that the latch circuit CSLn receives via its clock terminal CK has changed from a high level to a low level, the latch circuit CSLn latches the input state (low level or high level) of the polarity signal CMI2 that it received via its input terminal D at the time of change, and keeps the latched state until the next time when the potential level of the gate signal Gn+1 that the latch circuit CSLn receives via its clock terminal CK is raised to a high level. Then, the latch circuit CSLn outputs the latched state as the CS signal CSOUTn, which indicates the change in potential level, via its output terminal OUT.

Figure 19:
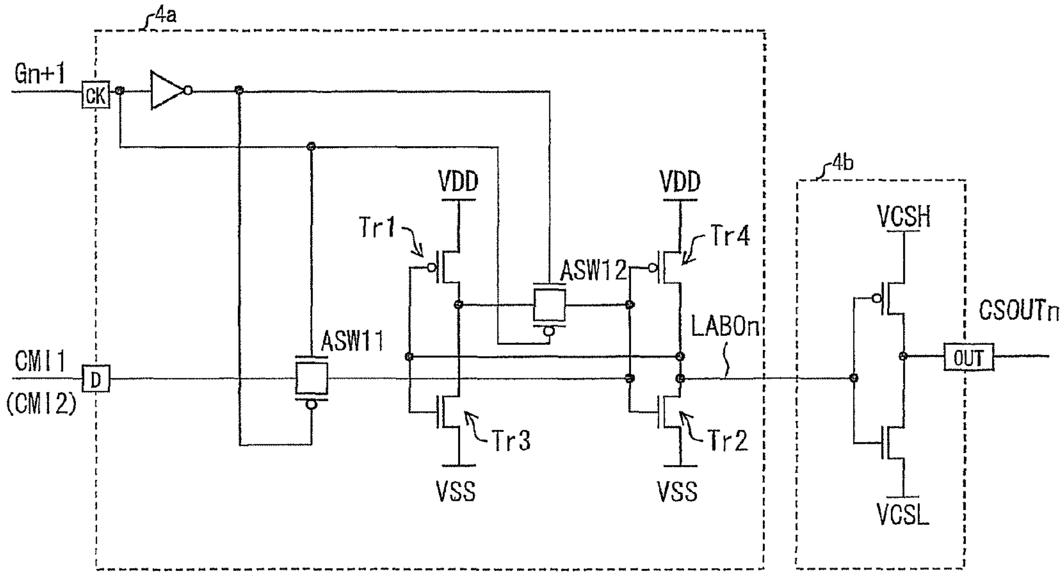
FIG. 19 is a circuit diagram of the latch circuit shown in FIG. 18.

It should be noted that the latch circuit CSLn can be specifically achieved, for example, by a configuration shown in the circuit diagram of FIG. 19. As shown in FIG. 19, the latch circuit CSLn is configured to include a latch through circuit 4*a* and a buffer 4*b*. The latch through circuit 4*a* is constituted by four transistors, two analog switching circuits SW11 and SW12, and one inverter, and the buffer 4*b* is constituted by two transistors.

(As to an Initial Operation)

Figure 20:
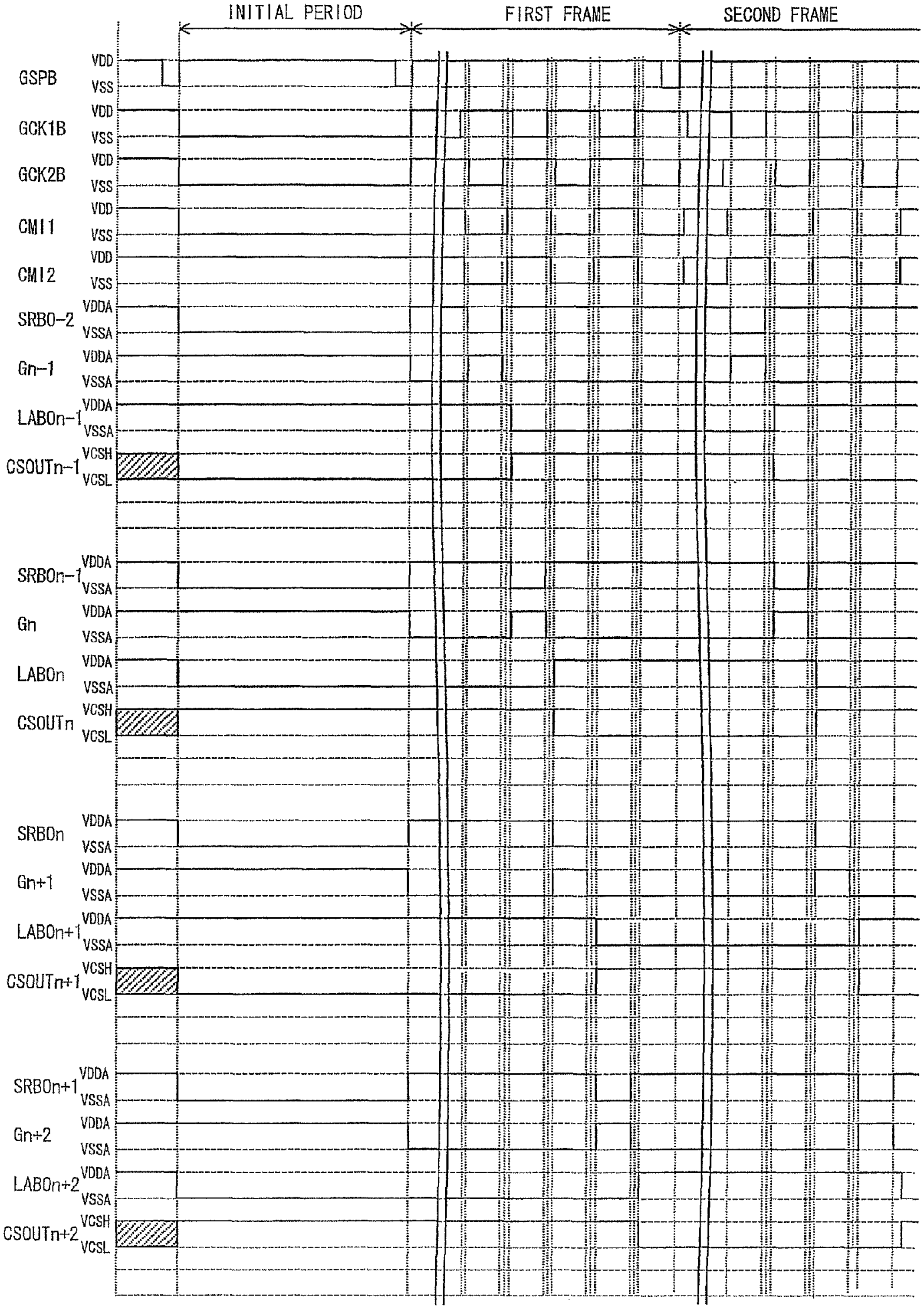
FIG. 20 is a timing chart showing waveforms of various signals that are inputted to and outputted from the latch circuit shown in FIG. 18.

FIG. 20 is a timing chart showing waveforms of various signals that are inputted to and outputted from the shift register circuits SR and the D latch circuits CSL. FIG. 20 shows waveforms during an initial operation after the liquid crystal display device 1 has been turned on, an operation in the first vertical scanning period (first frame) of a display picture, and an operation in the next vertical scanning period (second frame). The initial operation is explained here.

In an initial state (initial period) after turning on of the liquid crystal display device 1, the clock signals GCK1B and GCK2B are set to a low level. The polarity signal CMI1 is set to a low level in the initial state, and the polarity signal CMI2 is set to a high level in the initial state. In the first frame and later, the polarity signals CMI1 and CMI2 become identical in waveform. Specifically, when the liquid crystal display device 1 has been turned on, the control circuit 50 (see FIG. 1) outputs control signals such as GSPB in accordance with which GCK1B, GCK2B, and CMI1 are outputted at a low level and CMI2 is outputted at a high level. At the same time, GSPB is inputted to the shift register circuit SR0 of the first stage (the zeroth row).

It should be noted here that, as shown in FIG. 5, the shift register circuit SRn outputs CKB or Vdd in accordance with the internal signal Mn, which controls the analog switching circuits SW1 and SW2. That is, while the internal signal Mn is active (at a high level), the analog switching circuit SW1 is turned on so that CKB is kept being outputted. Moreover, while the set signal SB, which is inputted to the shift register circuit SRn, is active, the internal signal Mn is maintained in an active state (see FIG. 6). Therefore, while an active signal is being inputted to the shift register circuit SRn, the internal signal Mn becomes active, and CKB is kept being outputted. Since, in the initial state, CKB is set to a low level, a low-level signal is outputted while an active signal is being inputted to the shift register circuit SRn.

With this configuration, at the same time as GSPB is inputted to the first-stage shift register circuit SR0, a low-level signal is inputted to each shift register circuit SR and the internal signal M and the output signal OUTB (SRBO) become active. It should be noted that an internal delay in signal wiring or the like is omitted for the sake of convenience.

In the initial state, as described above, the shift register circuit SR at each stage outputs the clock signal CKB at a low level. It should be noted that the clock signal CKB outputted at a low level from the shift register circuit SR at each stage is supplied to the corresponding gate line GL via a buffer (see FIG. 17), whereby all the gate lines GL become active. For example, by supplying the counter electrode potential Vcom to each source line here, the potentials of all the pixel electrodes in the initial state can be fixed at Vcom.

During the above operation, the signal (gate signal Gn+1) outputted from the shift register circuit SRn via a buffer is inputted to the latch circuit CSLn shown in FIG. 17. When the latch through circuit 4*a*, which constitutes the latch circuit CSLn, receives an active (high-level) gate signal Gn+1 via its clock terminal CK, the analog switching circuit SW11 is turned on, and the polarity signal CMI2 (at a high level) inputted to the input terminal D is inputted to the transistor Tr3 so that the transistor Tr1 is turned on, whereby a signal LABOn is outputted at a low level (Vss) (see FIG. 20). When the signal LABOn outputted from the latch through circuit 4*a* is inputted to the buffer 4*b*, the transistor Tr4 is turned on, whereby the signal CSOUTn is outputted at a high level (Vdd) (see FIG. 20).

When the latch through circuit 4*a* receives a non-active (low-level) gate signal Gn+1 via its clock terminal CK, the analog switching circuit SW11 is turned off and the analog switching circuit SW12 is turned on. This causes the analog switching circuit SW11 to latch the polarity signal CMI2 (at a high level) at the point in time where it was turned off, whereby the signal CSOUTn is outputted at a high level (Vdd) (see FIG. 20).

In the latch circuit CSLn, as described above, the output signal CSOUTn switches in potential in accordance with a change in potential of the polarity signal CMI2 while an active signal is being inputted from the shift register circuit SRn. Therefore, since, in the initial state, the polarity signal CMI2 is set to a high level, the output signal CSOUTn from the latch circuit CSLn is fixed at a high level. This eliminates an indefinite state (indicated by shaded areas in FIG. 20) immediately after turning on of power, and at the beginning of the start frame (first frame) of a display picture, the potential of each CS signal can be fixed at one side (in the nth row, a high level). This allows elimination of a display problem after turning on of power and before the beginning of the first frame. It should be noted that in the adjacent (n−1)th and (n+1)th rows, the potential of each CS signal is fixed at a low level.

(As to Operations in the First and Second Frames)

The following explains operations in the first and second frames with reference to FIG. 20. Operation of the shift register circuit SRn and latch circuit CSLn in the nth row is mainly explained here.

First, changes in waveform of various signals in the nth row are described.

In the initial state, as described above, the potential of the CS signal CSOUTn that the latch circuit CSLn outputs via its output terminal OUT is retained at a high level.

In the first frame, the latch through circuit 4*a* receives a gate signal Gn+1 via its clock terminal CK from the shift register circuit SRn. Upon receiving a change in potential of the gate signal Gn+1 (from low to high), the latch through circuit 4*a* transfers an input state of the polarity signal CMI2 that it received via its input terminal D at the point in time, i.e., transfers a low level, and outputs the change in potential of the polarity signal CMI2 until there is a change in potential of the gate signal Gn+1 (from high to low) that the latch through circuit 4*a* receives via its clock terminal CK (i.e., during a period of time in which the gate signal Gn+1 is at a high level). Since the polarity signal CMI2 is at a low level during the period of time in which the gate signal Gn+1 is at a high level, the latch through circuit 4*a* produces its output LABOn at a high level. Next, upon receiving a change in potential of the gate signal Gn+1 (from high to low) via its clock terminal CK, the latch through circuit 4*a* latches an input state of the polarity signal CMI2 that it received at the point in time, i.e., latches a low level. After that, the latch through circuit 4*a* retains its output LABOn at a high level until there is a change in potential of the gate signal Gn+1 in the second frame (from low to high). The latch through circuit 4*a* sends its output LABOn to the buffer 4*b*, whereby the latch circuit CSLn outputs CSOUTn (at a low level) shown in FIG. 20 via its output terminal OUT.

Similarly, in the second frame, the latch through circuit 4*a* receives a gate signal Gn+1 via its clock terminal CK from the shift register circuit SRn. When the gate signal Gn+1 changes from a low level to a high level, the latch through circuit 4*a* transfers an input state of the polarity signal CMI2 that it received via its input terminal D at the point in time, i.e., transfers a high level. Since the polarity signal CMI2 is at a high level during the period of time in which the gate signal Gn+1 is at a high level, the latch through circuit 4*a* produces its output LABOn at a low level. Next, upon receiving a change in potential of the gate signal Gn+1 (from high to low) via its clock terminal CK, the latch through circuit 4*a* latches an input state of the polarity signal CMI2 that it received at the point in time, i.e., latches a high level. After that, the latch through circuit 4*a* retains its output LABOn at a low level until there is a change in potential of the gate signal Gn+1 in the third frame. The latch through circuit 4*a* sends its output LABOn to the buffer 4*b*, whereby the latch circuit CSLn outputs CSOUTn (at a high level) shown in FIG. 20 via its output terminal OUT.

The CS signal CSOUTn thus generated is supplied to the CS bus line 15 of the nth row. It should be noted that in the third frame and later, signals identical in output waveform to those in the first and second frames are alternately outputted.

Next, changes in waveform of various signals in the (n+1) th row are described.

In the initial state, as described above, the potential of the CS signal CSOUTn+1 that the latch circuit CSLn+1 outputs via its output terminal OUT is retained at a low level.

In the first frame, the latch through circuit 4*a* receives a gate signal Gn+2 via its clock terminal CK from the shift register circuit SRn+1. Upon receiving a change in potential of the gate signal Gn+2 (from low to high), the latch through circuit 4*a* transfers an input state of the polarity signal CMI1 that it received via its input terminal D at the point in time, i.e., transfers a high level, and outputs the change in potential of the polarity signal CMI1 until there is a change in potential of the gate signal Gn+2 (from high to low) that the latch through circuit 4*a* receives via its clock terminal CK (i.e., during a period of time in which the gate signal Gn+2 is at a high level). Since the polarity signal CMI1 is at a high level during the period of time in which the gate signal Gn+2 is at a high level, the latch through circuit 4*a* produces its output LABOn at a low level. Next, upon receiving a change in potential of the gate signal Gn+2 (from high to low) via its clock terminal CK, the latch through circuit 4*a* latches an input state of the polarity signal CMI1 that it received at the point in time, i.e., latches a high level. After that, the latch through circuit 4*a* retains its output LABOn+1 at a low level until there is a change in potential of the gate signal Gn+2 in the second frame (from low to high). The latch through circuit 4*a* sends its output LABOn+1 to the buffer 4*b*, whereby the latch circuit CSLn+1 outputs CSOUTn+1 (at a high level) shown in FIG. 20 via its output terminal OUT.

Similarly, in the second frame, the latch through circuit 4*a* receives a gate signal Gn+2 via its clock terminal CK from the shift register circuit SRn+1. When the gate signal Gn+2 changes from a low level to a high level, the latch through circuit 4*a* transfers an input state of the polarity signal CMI1 that it received via its input terminal D at the point in time, i.e., transfers a low level. Since the polarity signal CMI1 is at a low level during the period of time in which the gate signal Gn+2 is at a high level, the latch through circuit 4*a* produces its output LABOn+1 at a high level. Next, upon receiving a change in potential of the gate signal Gn+2 (from high to low) via its clock terminal CK, the latch through circuit 4*a* latches an input state of the polarity signal CMI1 that it received at the point in time, i.e., latches a low level. After that, the latch through circuit 4*a* retains its output LABOn+1 at a high level until there is a change in potential of the gate signal Gn+2 in the third frame. The latch through circuit 4*a* sends its output LABOn+1 to the buffer 4*b*, whereby the latch circuit CSLn+1 outputs CSOUTn+1 (at a low level) shown in FIG. 20 via its output terminal OUT.

The CS signal CSOUTn+1 thus generated is supplied to the CS bus line 15 of the (n+1)th row. It should be noted that in the third frame and later, signals identical in output waveform to those in the first and second frames are alternately outputted. Moreover, the operations in the nth and (n+1)th rows correspond to operations of the latch circuits in each odd-numbered row and each even-numbered row.

Thus, the latch circuits CSL1, CSL2, CSL3, . . . , which correspond to their respective rows, output CS signals so that in all the frames that include the first frame, the potentials of the CS signals at points in time where the gate signals in their corresponding rows fall (at points in time where the TFTs 13 are switched from on to off) differ from one row to an adjacent row. This makes it possible to properly operate the CS bus line driving circuit 40 in all the frames in a 1H inversion driven liquid crystal display device.

(Embodiment 4)

Figure 21:
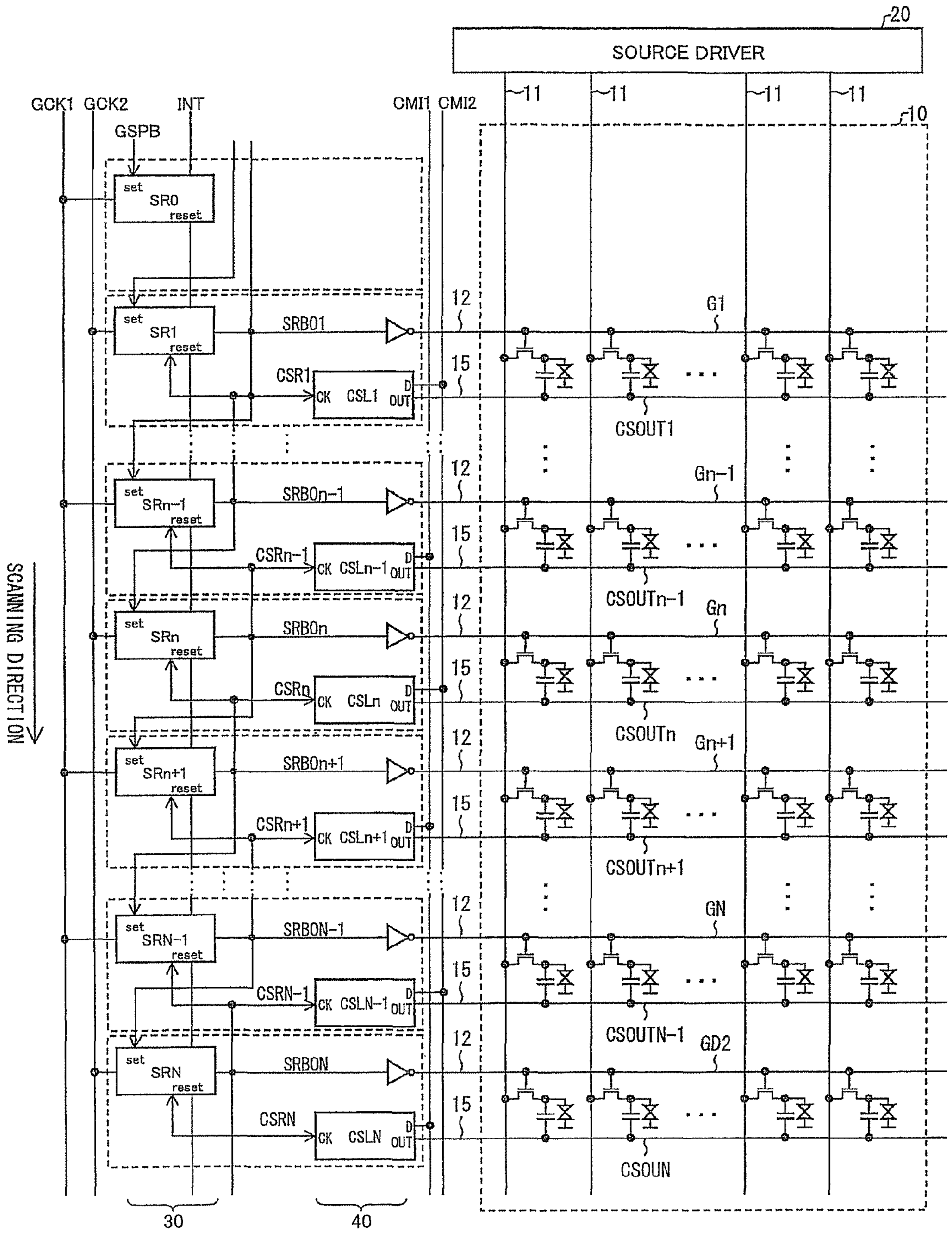
FIG. 21 is a block diagram showing a configuration of a gate line driving circuit and a CS bus line driving circuit in Embodiment 4.

FIG. 21 is a block diagram showing a configuration of a liquid crystal display device 1 of Embodiment 4. This liquid crystal display device has a gate line driving circuit 30 and a CS bus line driving circuit 40 formed integrally, and the CS bus line driving circuit 40 receives two polarity signals CMI1 and CMI2 different in phase from each other. The configuration is described below specifically.

The shift register circuit SRn−1 in the (n−1)th row receives the gate clock signal GCK1 via its clock terminal CK from the control circuit 50 (see FIG. 1), and receives a shift register output SRBOn−2 from the previous row (the (n−2)th row) via its input terminal SB as a set signal for the shift register circuit SRn−1. The shift register circuit SRn−1 has its output terminal OUTB connected to the input terminal SB of the shift register circuit SRn of the next row (the nth row). This allows the shift register circuit SRn−1 to output a shift register output SRBOn−1 via its output terminal OUTB to the shift register circuit SRn. The shift register circuit SRn−1 has its output terminal OUTB connected to the gate line 12 of the current row (the (n−1)th row) via a buffer. This allows the gate line 12 to be supplied with the gate signal Gn−1.

The latch circuit CSLn−1 in the (n−1)th row receives the polarity signal CMI1 from the control circuit 50 (see FIG. 1) and the shift register output SRBOn from the next row (the nth row). The latch circuit CSLn−1 has its output terminal OUT connected to the CS bus line 15 of the current row (the (n−1)th row). This allows the latch circuit CSLn−1 to output a CS signal CSOUTn−1 via its output terminal OUT to the CS bus line 15 of the current row.

The shift register circuit SRn in the nth row receives the gate clock signal GCK2 via its clock terminal CK from the control circuit 50 (see FIG. 1), and receives a shift register output SRBOn−1 from the previous row (the (n−1)th row) via its input terminal SB as a set signal for the shift register circuit SRn. The shift register circuit SRn has its output terminal OUTB connected to the input terminal SB of the shift register circuit SRn+1 of the next row (the (n+1)th row). This allows the shift register circuit SRn to output a shift register output SRBOn via its output terminal OUTB to the shift register circuit SRn+1. The shift register circuit SRn has its output terminal OUTB connected to the gate line 12 of the current row (the nth row) via a buffer. This allows the gate line 12 to be supplied with the gate signal Gn. Further, the shift register circuit SRn has its output terminal OUTB connected to the clock terminal CK of the latch circuit CSLn−1 of the previous row (the (n−1)th row). This allows the shift register circuit SRn to input its output signal SRBOn to the latch circuit CSLn−1.

The latch circuit CSLn in the nth row receives the polarity signal CMI2 from the control circuit 50 (see FIG. 1) and the shift register output SRBOn+1 from the next row (the (n+1)th row). The latch circuit CSLn has its output terminal OUT connected to the CS bus line 15 of the current row (the nth row). This allows the latch circuit CSLn to output a CS signal CSOUTn via its output terminal OUT to the CS bus line 15 of the current row.

The shift register circuit SRn+1 in the (n+1)th row receives the gate clock signal GCK1 via its clock terminal CK from the control circuit 50 (see FIG. 1), and receives a shift register output SRBOn from the previous row (the nth row) via its input terminal SB as a set signal for the shift register circuit SRn+1. The shift register circuit SRn+1 has its output terminal OUTB connected to the input terminal SB of the shift register circuit SRn+2 of the next row (the (n+2)th row). This allows the shift register circuit SRn+1 to output a shift register output SRBOn+1 via its output terminal OUTB to the shift register circuit SRn+2. The shift register circuit SRn+1 has its output terminal OUTB connected to the gate line 12 of the current row (the (n+1)th row) via a buffer. This allows the gate line 12 to be supplied with the gate signal Gn+1. Further, the shift register circuit SRn+1 has its output terminal OUTB connected to the clock terminal CK of the latch circuit CSLn of the previous row (the nth row). This allows the shift register circuit SRn+1 to input its output signal SRBOn+1 to the latch circuit CSLn.

The latch circuit CSLn+1 in the (n+1)th row receives the polarity signal CMI1 from the control circuit 50 (see FIG. 1) and the shift register output SRBOn+2 from the next row (the (n+2)th row). The latch circuit CSLn+1 has its output terminal OUTB connected to the CS bus line 15 of the current row (the (n+1)th row). This allows the latch circuit CSLn+1 to output a CS signal CSOUTn+1 via its output terminal OUT to the CS bus line 15 of the current row.

Figure 22:
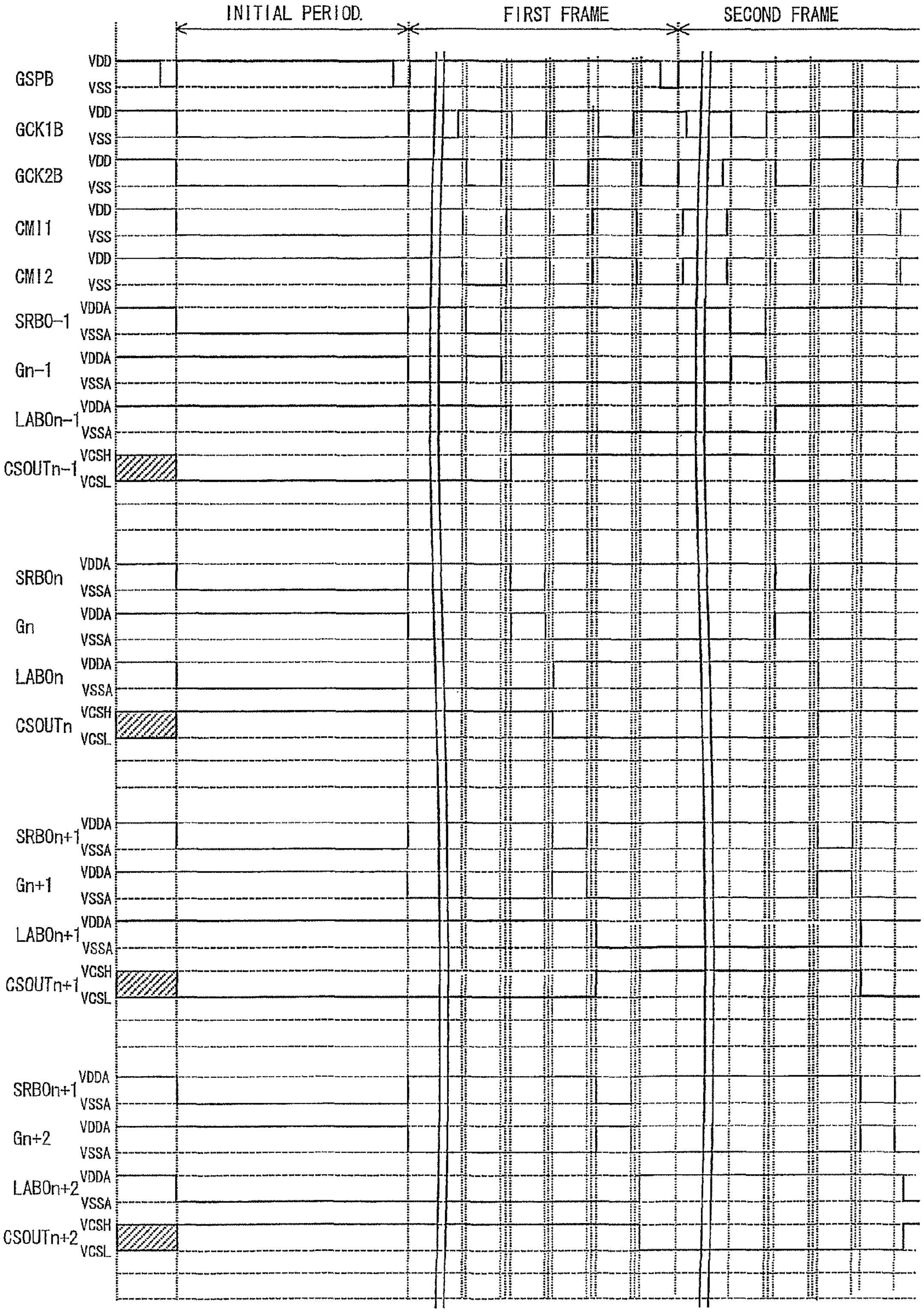
FIG. 22 is a timing chart showing waveforms of various signals that are inputted to and outputted from the latch circuit shown in FIG. 21.

FIG. 22 is a timing chart showing waveforms of various signals that are inputted to and outputted from the shift register circuit SR and the D latch circuit CSL in Embodiment 4. As shown in FIG. 22, in the initial period, the waveforms are the same as those described in Embodiment 3. That is, in the latch circuit CSLn, the output signal CSOUTn switches in potential in accordance with a change in potential of the polarity signal CMI2 while an active signal is being inputted from the shift register circuit SRn, and therefore is fixed at a high level. Further, the output signals CSOUTn−1 and CSOUTn+1 in the adjacent (n−1)th and (n+1)th rows switch in potential in accordance with a change in potential of the polarity signal CMI1, and therefore are fixed at a low level. This eliminates an indefinite state (indicated by shaded areas in FIG. 22) immediately after turning on of power, and at the beginning of the start frame (first frame) of a display picture, the potential of each CS signal can be fixed at a low or high level. This allows elimination of a display problem after turning on of power and before the beginning of the first frame.

The operations in the first and second frames are the same as those described in Embodiment 3 and, as such, are not described here. According to the operation shown in FIG. 22, the latch circuits CSL1, CSL2, CSL3, . . . , which correspond to their respective rows, output CS signals so that in all the frames that include the first frame, the potentials of the CS signals at points in time where the gate signals, in their corresponding rows fall (at points in time where the TFTs 13 are switched from on to off) differ from one row to an adjacent row. This makes it possible to properly operate the CS bus line driving circuit 40 in all the frames in a 1H inversion driven liquid crystal display device.

(Embodiment 5)

Figure 23:
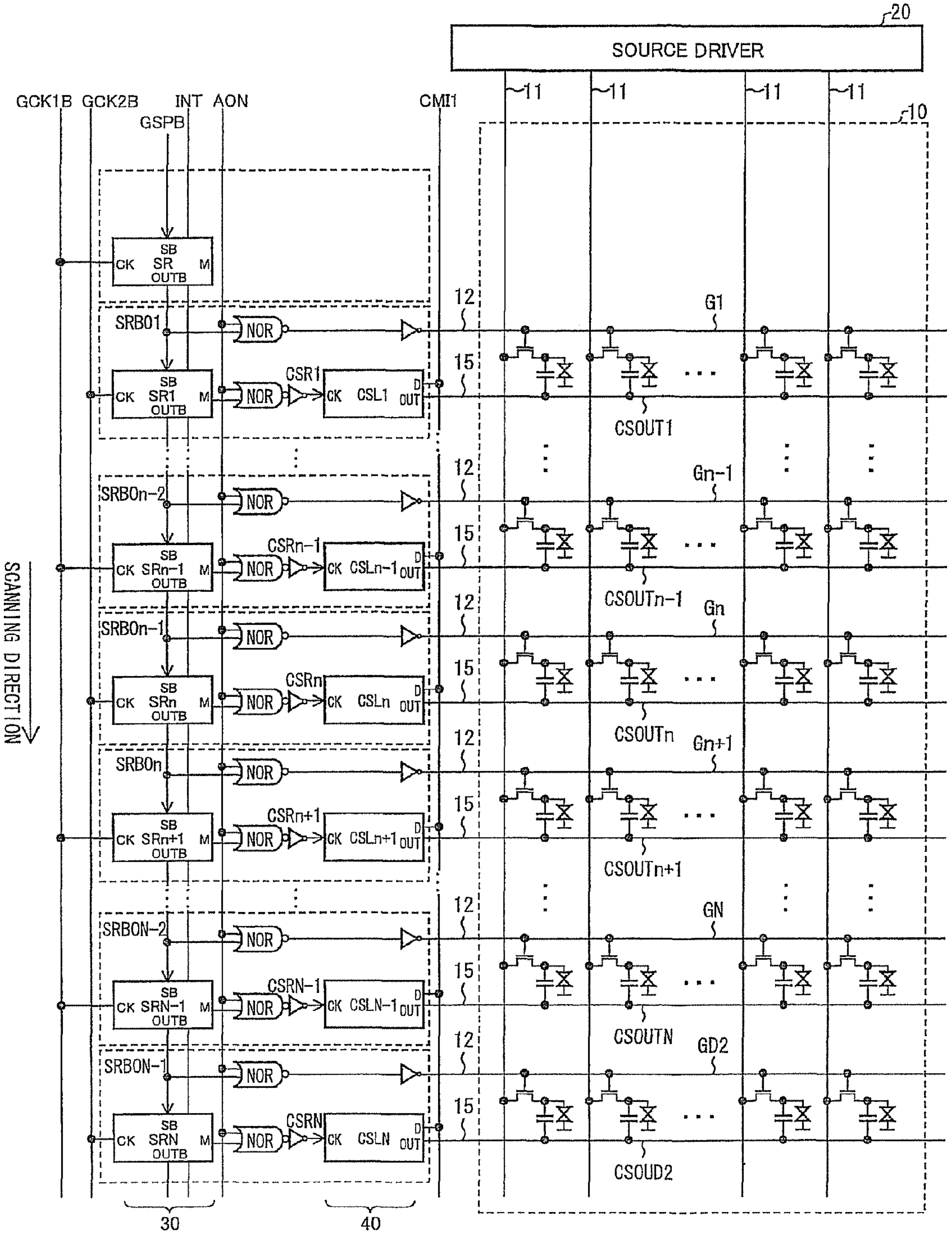
FIG. 23 is a block diagram showing a configuration of a gate line driving circuit and a CS bus line driving circuit in Embodiment 5.

FIG. 23 is a block diagram showing a configuration of a liquid crystal display device 1 of Embodiment 5. This liquid crystal display device has a gate line driving circuit 30 and a CS bus line driving circuit 40 formed integrally, and the CS bus line driving circuit 40 receives an AONB signal (all-ON signal, simultaneous selection signal) and a polarity signal CMI. The configuration is described below specifically.

The shift register circuit SRn−1 in the (n−1)th row receives the gate clock signal GCK1 via its clock terminal CK from the control circuit 50 (see FIG. 1), and receives a shift register output SRBOn−2 from the previous row (the (n−2)th row) via its input terminal SB as a set signal for the shift register circuit SRn−1. The shift register circuit SRn−1 has its output terminal OUTS connected to the input terminal SB of the shift register circuit SRn of the next row (the nth row). This allows the shift register circuit SRn−1 to output a shift register output SRBOn−1 via its output terminal OUTB to the shift register circuit SRn. The shift register circuit SRn−1 has its output terminal M connected one terminal of a NOR circuit (second logic circuit), and the AONB signal is inputted to the other terminal of the NOR circuit. The NOR circuit has its output terminal connected to the clock terminal CK of the latch circuit CSLn−1 of the current row (the (n−1)th row) via an inverter. This allows the latch circuit CSLn−1 to receive the signal CSRn−1 (internal signal Mn−1) (control signal) inside of the shift register circuit SRn−1 or the AONB signal.

Further, the shift register output SRBOn−2 from the previous row (the (n−2)th row) is both inputted to the shift register circuit SRn−1 and inputted to one terminal of a NOR circuit (first logic circuit). The AONB signal is inputted to the other terminal of the NOR circuit, and the output from the NOR circuit is outputted as a gate signal Gn−1 to the gate line 12 of the current row (the (n−1)th row) via a buffer. Further, the shift register circuit SRn−1 is supplied with an INITB signal (initialization signal).

The latch circuit CSLn−1 in the (n−1)th row receives the polarity signal CMI from the control circuit 50 (see FIG. 1) and the output from the NOR circuit (i.e., the internal signal Mn−1 (signal CSRn−1) from the shift register circuit SRn−1 or the AONB signal). The latch circuit CSLn−1 has its output terminal OUT connected to the CS bus line 15 of the current row (the (n−1)th row). This allows the latch circuit CSLn−1 to output a CS signal CSOUTn−1 via its output terminal OUT to the CS bus line 15 of the current row.

The shift register circuit SRn in the nth row receives the gate clock signal GCK2 via its clock terminal CK from the control circuit 50 (see FIG. 1), and receives a shift register output SRBOn−1 from the previous row (the (n−1)th row) via its input terminal SB as a set signal for the shift register circuit SRn. The shift register circuit SRn has its output terminal OUTB connected to the input terminal SB of the shift register circuit SRn+1 of the next row (the (n+1)th row). This allows the shift register circuit SRn to output a shift register output SRBOn via its output terminal OUTB to the shift register circuit SRn+1. The shift register circuit SRn has its output terminal M connected one terminal of a NOR circuit, and the AONB signal is inputted to the other terminal of the NOR circuit. The NOR circuit has its output terminal connected to the clock terminal CK of the latch circuit CSLn of the current row (the nth row) via an inverter. This allows the latch circuit CSLn to receive the internal signal Mn (signal CSRn) from the shift register circuit SRn or the AONB signal.

Further, the shift register output SRBOn−1 from the previous row (the (n−1)th row) is both inputted to the shift register circuit SRn and inputted to one terminal of a NOR circuit. The AONB signal is inputted to the other terminal of the NOR circuit, and the output from the NOR circuit is outputted as a gate signal Gn to the gate line 12 of the current row (the nth row) via a buffer. Further, the shift register circuit SRn is supplied with the INITB signal (initialization signal).

The latch circuit CSLn in the nth row receives the polarity signal CMI from the control circuit 50 (see FIG. 1) and the output from the NOR circuit (i.e., the internal signal Mn (signal CSRn) from the shift register circuit SRn or the AONB signal). The latch circuit CSLn has its output terminal OUT connected to the CS bus line 15 of the current row (the nth row). This allows the latch circuit CSLn to output a CS signal CSOUTn via its output terminal OUT to the CS bus line 15 of the current row.

The shift register circuit SRn+1 in the (n+1)th row receives the gate clock signal GCK1 via its clock terminal CK from the control circuit 50 (see FIG. 1), and receives a shift register output SRBOn from the previous row (the nth row) via its input terminal SB as a set signal for the shift register circuit SRn+1. The shift register circuit SRn+1 has its output terminal OUTB connected to the input terminal SB of the shift register circuit SRn+2 of the next row (the (n+2)th row). This allows the shift register circuit SRn+1 to output a shift register output SRBOn+1 via its output terminal OUTB to the shift register circuit SRn+2. The shift register circuit SRn+1 has its output terminal M connected one terminal of a NOR circuit, and the AONB signal is inputted to the other terminal of the NOR circuit. The NOR circuit has its output terminal connected to the clock terminal CK of the latch circuit CSLn+1 of the current row (the (n+1)th row) via an inverter. This allows the latch circuit CSLn+1 to receive the internal signal Mn+1 (signal CSRn+1) inside of the shift register circuit SRn+1 or the AONB signal.

Further, the shift register output SRBOn from the previous row (the nth row) is both inputted to the shift register circuit SRn+1 and inputted to one terminal of a NOR circuit. The AONB signal is inputted to the other terminal of the NOR circuit, and the output from the NOR circuit is outputted as a gate signal Gn+1 to the gate line 12 of the current row (the (n+1)th row) via a buffer. Further, the shift register circuit SRn+1 is supplied with the INITB signal (initialization signal).

The latch circuit CSLn+1 in the (n+1)th row receives the polarity signal CMI from the control circuit 50 (see FIG. 1) and the output from the NOR circuit (i.e., the internal signal Mn+1 (signal CSRn+1) from the shift register circuit SRn+1 or the AONB signal). The latch circuit CSLn+1 has its output terminal OUT connected to the CS bus line 15 of the current row (the (n+1)th row). This allows the latch circuit CSLn+1 to output a CS signal CSOUTn+1 via its output terminal OUT to the CS bus line 15 of the current row.

Each shift register circuit SR is identical in configuration to that of Embodiment 1 shown in FIG. 5, and its operation is represented by waveforms shown in FIG. 6. A description of each shift register circuit SR is omitted here. Further, each latch circuit CSLn is identical in specific configuration to that shown in FIGS. 7 and 8.

Figure 24:
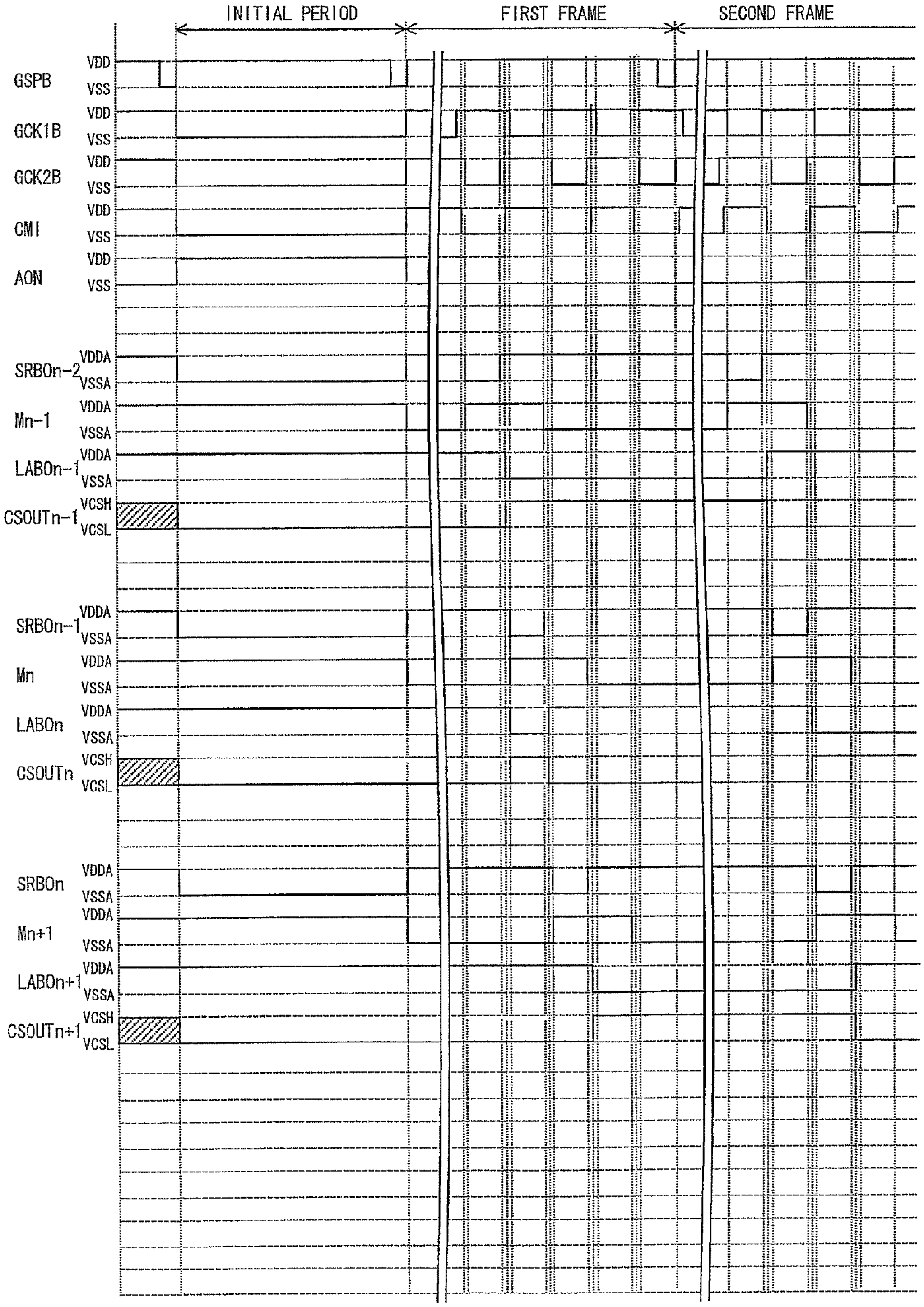
FIG. 24 is a timing chart showing waveforms of various signals that are inputted to and outputted from the latch circuit shown in FIG. 23.

In the liquid crystal display device 1 according to Embodiment 5 thus configured, in the initial period, the AONB signal becomes active, whereby all the gate lines become active, and each latch circuit CSL of the CS bus line driving circuit is initialized. FIG. 24 is a timing chart showing waveforms of various signals that are inputted to and outputted from the shift register circuits SR and the D latch circuits CSL. An initial operation is described with reference to FIG. 24.

In an initial state (initial period) after turning on of the liquid crystal display device 1, the clock signals GCK1B and GCK2B and the polarity signal CMI are set to a low level, and the AON signal is set to a high level. Specifically, when the liquid crystal display device 1 has been turned on, the control circuit 50 (see FIG. 1) outputs control signals such as GSPB in accordance with which GCK1B, GCK2B, and CMI are outputted at a low level and AON is outputted at a high level. At the same time, GSPB is inputted to the shift register circuit SR0 of the first stage (the zeroth row).

This allows each of the NOR circuits connected to the corresponding gate lines 12 in the respective rows to receive a shift register output at a high level from the corresponding shift register circuit and the AON signal at a high level. This allows each of the gate lines 12 to be supplied with a gate signal G at a high level, whereby all the gate lines 12 become active. It should be noted here that by supplying each source line with the counter electrode potential Vcom, the potentials of all the pixel electrodes in the initial state can be fixed at Vcom.

Further, each of the NOR circuits connected to the corresponding latch circuits CSL in the respective rows receives an internal signal M at a high level from the corresponding shift register circuit and the AON signal at a high level. This causes each CS signal CSOUT to be fixed at a low level in accordance with CMI at a low level (see FIG. 8). This eliminates an indefinite state (indicated by shaded areas in FIG. 24) immediately after turning on of power, and at the beginning of the start frame (first frame) of a display picture, the potential of each CS signal can be fixed at one side (in the example shown in FIG. 24, a low level). This allows elimination of a display problem after turning on of power and before the beginning of the first frame.

The display driving circuit may also be configured such that the retention target signal is constant in potential level before the first vertical scanning period of the display picture.

The display driving circuit may also be configured such that the retention target signal has a positive or negative polarity before the first vertical scanning period of the display picture, and in the vertical scanning period and later, the retention target signal reverses its polarity in synchronization with a horizontal scanning period in each row.

The display driving circuit may also be configured such that immediately after a scanning signal that is supplied to a scanning signal line connected pixels corresponding to a current stage has changed from active to non-active and while the control signal generated by a next stage of the shift register is active, the retention target signal that is inputted to a retaining circuit corresponding to the next stage changes in potential.

This allows generating a retention capacitor wire signal properly in the first frame in carrying out line inversion driving, thus allowing elimination of appearance of a transverse stripe every single row in the first frame.

The display driving circuit may also be configured such that: when a control signal generated by a current stage of the shift register becomes active, a retaining circuit corresponding to the current stage loads and retains the retention target signal; and an output signal from the current stage of the shift register is supplied as a scanning signal to a scanning signal line connected to pixels corresponding to the current stage, and an output from a retaining circuit corresponding to the current stage is supplied as the retention capacitor wire signal to a retention capacitor wire forming capacitors with pixel electrodes of pixels corresponding to a previous stage preceding the current stage.

The display driving circuit may also be configured such that a control signal that is generated by a current stage of the shift register is generated in accordance with an output signal from a previous stage of the shift register by which output signal the current stage of the shift register is set and an output signal from the current stage of the shift register by which output signal the current stage of the shift register is reset.

The display driving circuit may also be configured such that a control signal generated by a current stage of the shift register is active during a period from a point in time where an output signal from a previous stage of the shift register by which output signal operation of the current stage of the shift register is started is inputted to the current stage of the shift register to a point in time where a reset signal by which the operation of the current stage of the shift register is terminated is inputted to the current stage of the shift register.

The display driving circuit may also be configured such that the retention target signal has a positive or negative polarity before the first vertical scanning period of the display picture, and in the vertical scanning period and later, the retention target signal reverses its polarity in synchronization with a vertical scanning period.

This allows generating a retention capacitor wire signal properly in carrying out frame inversion driving.

The display driving circuit may also be configured such that before a first vertical scanning period of a display picture, a retaining circuit corresponding to one of adjacent rows of pixels is supplied with the retention target signal of a positive polarity, and a retaining circuit corresponding to the other rows of pixels is supplied with the retention target signal of a negative polarity.

The display driving circuit may also be configured such that a retention target signal that is inputted to a plurality of retaining circuits and a retention target signal that is inputted to another plurality of retaining circuits are different in phase from each other.

The display driving circuit may also be configured such that one of two retaining circuits corresponding to adjacent rows is supplied with a first retention target signal, and the other retaining circuit is supplied with a second retention target signal that is different in phase from the first retention target signal.

The display driving circuit may also be configured such that: the control signal generated by a current stage of the shift register is an output signal from the current stage of the shift register; and the output signal from the current stage of the shift register is inputted to a subsequent stage of the shift register and a retaining circuit of the current stage.

The display driving circuit may also be configured such that: a simultaneous selection signal by which the plurality of scanning signal lines are simultaneously selected and an output signal from a current stage of the shift register are inputted to a first logic circuit corresponding to the current stage, and an output from the first logic circuit is supplied as a scanning signal to a scanning signal line connected to pixels corresponding to the current stage; and the simultaneous selection signal and a control signal generated by a next stage of the shift register are inputted to a second logic circuit corresponding to the current stage, and an output from the second logic circuit is supplied as the retention capacitor wire signal to a retention capacitor wire forming capacitors with pixel electrodes of the pixels corresponding to the current stage.

The display driving circuit may also be configured such that the control signal is generated by a current stage of the shift register, supplied as a scanning signal to a scanning signal line connected to pixels corresponding to a next stage, and supplied to a retaining circuit of the current stage.

For example, in the case of application of a configuration of the display driving circuit in a configuration in which the shift register is provided on one side of the display panel and the retaining circuits are provided on the other side of the display panel, i.e., in a configuration in which the shift register and the retaining circuits are provided with a display region of the display panel interposed therebetween, it is not necessary to provide separate control signal lines via which the control signal is inputted. This allows an increase in aperture ratio of the display panel.

The display driving circuit may also be configured such that each of the retaining circuits is constituted as a D latch circuit or a memory circuit.

A display device according to the present invention includes: any one of the display driving circuits; and the display panel.

It should be noted that it is preferable that the display device according to the present invention be a liquid crystal display device.

INDUSTRIAL APPLICABILITY

The present invention can be suitably applied, in particular, to driving of an active-matrix liquid crystal display device.

REFERENCE SIGNS LIST

1 Liquid crystal display device (display device)
10 Liquid crystal display panel (display panel)
11 Source bus line (data signal line)
12 Gate line (scanning signal line)
13 TFT (switching element)
14 Pixel electrode
15 CS bus line (retention capacitor wire)
20 Source bus line driving circuit (data signal line driving circuit)
30 Gate line driving circuit (scanning signal line driving circuit)
40 CS bus line driving circuit (retention capacitor wire driving circuit)
50 Control circuit
CSL Latch circuit (retaining circuit, retention capacitor wire driving circuit)
SR Shift register circuit
NOR NOR circuit (first logic circuit, second logic circuit)

The invention claimed is:

1. A display driving circuit for driving a display panel provided with retention capacitor wires forming capacitors with pixel electrodes included in pixels, the display driving circuit comprising:

a retention capacitor wire driving circuit configured to supply a retention capacitor wire signal to the retention capacitor wires; and a scanning signal line driving circuit configured to supply a scanning signal to scanning signal lines, the scanning signal line driving circuit including a shift register including a plurality of stages provided in such a way as to correspond to a plurality of scanning signal lines, respectively, wherein the retention capacitor wire driving circuit is provided with retaining circuits in such a way as to correspond one-by-one to the plurality of stages of the shift register, a retention target signal being inputted to each of the retaining circuits, when a control signal generated by one of the plurality of stages of the shift register becomes active, one of the retaining circuits corresponding to the one of the plurality of stages is configured to load and retain the retention target signal, an output from the one of the retaining circuits is supplied to a corresponding one of the retention capacitor wires as a retention capacitor wire signal, a control signal that is generated by each of the plurality of stages of the shift register becomes active before a first vertical scanning period of a display picture after turning on of power, and the retention target signal has a constant potential level before the first vertical scanning period of the display picture.

2. The display driving circuit as set forth in claim 1, wherein the retention target signal has a positive or negative polarity before the first vertical scanning period of the display picture, and in the first vertical scanning period and vertical scanning periods thereafter, the retention target signal reverses its polarity in synchronization with a horizontal scanning period in each row.

3. The display driving circuit as set forth in claim 1, wherein immediately after the scanning signal that is supplied to one of the scanning signal lines connected to pixels, corresponding to a current one of the plurality of stages, has changed from being active to non-active and while a next control signal generated by a next one of the plurality of stages of the shift register is active, the retention target signal that is inputted to a next one of the retaining circuits corresponding to the next one of the plurality of stages changes its corresponding potential.

4. The display driving circuit as set forth in claim 1, wherein when a current control signal generated by a current one of the plurality of stages of the shift register becomes active, a current one of the retaining circuits corresponding to the current one of the plurality of stages is configured to load and retain the current retention target signal, an output signal from the current one of the plurality of stages of the shift register is supplied as the scanning signal to one of the scanning signal lines connected to pixels corresponding to the current one of the plurality of stages, and an output from a retaining circuit corresponding to the current one of the plurality of stages is supplied as the retention capacitor wire signal to one of the retention capacitor wires forming capacitors with pixel electrodes of pixels corresponding to a previous one of the plurality of stages preceding the current one of the plurality of stages.

5. The display driving circuit as set forth in claim 1, wherein a control signal that is generated by a current one of the plurality of stages of the shift register is generated in accordance with an output signal from a previous one of the plurality of stages of the shift register by which output signal of the current one of the plurality of stages of the shift register is set, and an output signal from the current one of the plurality of stages of the shift register by which output signal of the current one of the plurality of stages of the shift register is reset.

6. The display driving circuit as set forth in claim 1, wherein the control signal generated by a current one of the plurality of stages of the shift register is active during a period from a point in time where an output signal from a previous one of the plurality of stages of the shift register, by which output signal operation of the current one of the plurality of stages of the shift register is started, is inputted to the current one of the plurality of stages of the shift register to a point in time where a reset signal by which the operation of the current one of the plurality of stages of the shift register is terminated, and the control signal generated by the current one of the plurality of stages is inputted to the current one of the plurality of stages of the shift register.

7. The display driving circuit as set forth in claim 1, wherein the retention target signal has a positive or negative polarity before the first vertical scanning period of the display picture, and in the first vertical scanning period and vertical scanning periods thereafter, the retention target signal reverses its polarity in synchronization with a vertical scanning period.

8. The display driving circuit as set forth in claim 1, wherein before the first vertical scanning period of the display picture, a first one of the retaining circuits corresponding to one of adjacent rows of pixels is supplied with a retention target signal of a positive polarity, and a second one of the retaining circuits corresponding to other rows of pixels is supplied with a retention target signal of a negative polarity.

9. The display driving circuit as set forth in claim 8, wherein a first retention target signal that is inputted to a first plurality of the retaining circuits and a second retention target signal that is inputted to a second plurality of the retaining circuits are different in phase from each other.

10. The display driving circuit as set forth in claim 8, wherein the retention target signal of the positive polarity supplied to the first one of the retaining circuits has a different phase from the retention target signal of the negative polarity supplied to second one of the retaining circuits.

11. The display driving circuit as set forth in claim 7, wherein the control signal generated by a current one of the plurality of stages of the shift register is an output signal from the current one of the plurality of stages of the shift register, and the output signal from the current one of the plurality of stages of the shift register is inputted to a subsequent one of the plurality of stages of the shift register and one of the retaining circuits corresponding to the current one of the plurality of stages.

12. The display driving circuit as set forth in claim 1, wherein a simultaneous selection signal by which the plurality of scanning signal lines are simultaneously selected and an output signal from a current one of the plurality of stages of the shift register are inputted to a first logic circuit corresponding to the current one of the plurality of stages, and an output from the first logic circuit is supplied as the scanning signal to one of the scanning signal lines connected to pixels corresponding to the current one of the plurality of stages, the simultaneous selection signal and a control signal generated by a next one of the plurality of stages of the shift register are inputted to a second logic circuit corresponding to the current one of the plurality of stages, and an output from the second logic circuit is supplied as the retention capacitor wire signal to one of the retention capacitor wires forming capacitors with pixel electrodes of the pixels corresponding to the current one of the plurality of stages.

13. The display driving circuit as set forth in claim 1, wherein the control signal is generated by a current one of the plurality of stages of the shift register, supplied as the scanning signal to one of the scanning signal lines connected to pixels corresponding to a next one of the plurality of stages, and supplied to one of the retaining circuits corresponding to the current one of the plurality of stages.

14. The display driving circuit as set forth in claim 1, wherein each of the retaining circuits is constituted as a D latch circuit or a memory circuit.

15. A display device comprising:

the display driving circuit as set forth in claim 1; and the display panel.

16. A display driving method for driving a display panel, provided with retention capacitor wires forming capacitors with pixel electrodes included in pixels, which includes a shift register including a plurality of stages provided in such a way as to correspond to a plurality of scanning signal lines, respectively, the display driving method comprising:

inputting a retention target signal to retaining circuits provided in such a way as to correspond to the plurality of stages of the shift register, respectively, when a control signal generated by a current one of the plurality of stages of the shift register becomes active, causing one of the retaining circuits corresponding to the current one of the plurality of stages to load and retain the retention target signal;

supplying an output from the one of the retaining circuits to one of the retention capacitor wires as a retention capacitor wire signal; and before a first vertical scanning period of a display picture after turning on of power, activating a corresponding control signal that is generated by each of the plurality of stages of the shift register, wherein the retention target signal has a constant potential level before the first vertical scanning period of the display picture.

* * * * *